US009049691B2

(12) United States Patent
Aminaka et al.

(10) Patent No.: US 9,049,691 B2
(45) Date of Patent: Jun. 2, 2015

(54) BASE STATION APPARATUS, CONTROL METHOD OF BASE STATION APPARATUS, COMMUNICATION SYSTEM, AND STORAGE MEDIUM STORING PROGRAM

(75) Inventors: Hiroaki Aminaka, Tokyo (JP); Kojiro Hamabe, Tokyo (JP); Motoki Morita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 493 days.

(21) Appl. No.: 13/124,041

(22) PCT Filed: Aug. 31, 2009

(86) PCT No.: PCT/JP2009/004250
§ 371 (c)(1),
(2), (4) Date: Apr. 13, 2011

(87) PCT Pub. No.: WO2010/061503
PCT Pub. Date: Jun. 3, 2010

(65) Prior Publication Data
US 2011/0201367 A1 Aug. 18, 2011

(30) Foreign Application Priority Data

Nov. 28, 2008 (JP) .................. 2008-304754

(51) Int. Cl.
*H04B 7/00* (2006.01)
*H04W 72/02* (2009.01)
*H04W 28/04* (2009.01)
*H04W 88/08* (2009.01)

(52) U.S. Cl.
CPC ............. *H04W 72/02* (2013.01); *H04W 28/04* (2013.01); *H04W 88/08* (2013.01)

(58) Field of Classification Search
CPC ............ H04W 16/14; H04W 72/0453; H04W 72/0406; H04W 72/0426; H04W 52/244; H04W 72/10
USPC .................................. 455/446, 561, 444, 443
See application file for complete search history.

(56) References Cited

U.S. PATENT DOCUMENTS

| 2004/0106412 A1 | 6/2004 | Laroia et al. |
| 2009/0124261 A1 | 5/2009 | Shimomura |
| 2009/0186621 A1* | 7/2009 | Umeda et al. ................. 455/446 |

FOREIGN PATENT DOCUMENTS

| GB | 2 428 937 A | 2/2007 |
| JP | 2004-194213 A | 7/2004 |
| WO | 2008/007437 A1 | 1/2008 |

OTHER PUBLICATIONS

"Introduction of Dual-Cell HSDPA Operation on Adjacent Carriers", 3GPP TSG-RAN WG1, Meeting #54bis, Prague, Czech Republic, Sep. 29-Oct. 3, 2008, 52 pages, R1-084029.

(Continued)

*Primary Examiner* — Tu X Nguyen
(74) *Attorney, Agent, or Firm* — Sughrue Mion, PLLC

(57) ABSTRACT

A base station 1 includes a radio communication unit 11 and a frequency channel control unit 15. The radio communication unit 11 is capable of forming a primary cell and a secondary cell, and transmitting a physical channel for data transmission (HS-PDSCH) in each of these two cells. Further, the frequency channel control unit 15 determines a frequency channel available to the secondary cell based on the load status of a nearby cell formed by a nearby base station 7. In this way, the interference to the nearby cell caused by the base station 1 is suppressed.

33 Claims, 18 Drawing Sheets

(56) References Cited

OTHER PUBLICATIONS

"Introduction of Dual-Cell HSDPA Operation on Adjacent Carriers", 3GPP TSG-RAN EG1, Meeting #54bis, Prague, Czech Republic, Sep. 29-Oct. 3, 2008, 2008, 97 pages, R1-084030.

"Introduction of Dual-Cell HSDPA Operation on Adjacent Carriers", 3GPP, TSG-RAN WG1, Meeting #54bis, Prague, Czech Republic, Sep. 29-Oct. 3, 2008, 2008, 85 pages, R1-084031.

"3G Home NodeB Study Item Technical Report", 3GPP TR 25.820, Sep. 2008, 40 pages, V8.2.0.

"Discussion on Exchange of the Anchor Carrier and the Supplementary Carrier Cells", 3GPP TSG-RAN WG2 #62bis, Warsaw, Poland, Jun. 30-Jul. 4, 2008, pp. 1-3, R2-083576.

International Search Report for PCT/JP2009/004250 dated Dec. 8, 2009.

Office Action, dated Feb. 25, 2014, issued by the State Intellectual Property Office of the People's Republic of China, in counterpart Application No. 200980147573.4.

* cited by examiner

BASE STATION APPARATUS, CONTROL METHOD OF BASE STATION APPARATUS, COMMUNICATION SYSTEM, AND STORAGE MEDIUM STORING PROGRAM

CROSS REFERENCE TO RELATED APPLICATIONS

This is a National Stage of International Application No. PCT/JP2009/004250 filed Aug. 31, 2009, claiming priority based on Japanese Patent Application No. 2008-304754 filed Nov. 28, 2008, the contents of all of which are incorporated herein by reference in their entirety.

TECHNICAL FIELD

The present invention relates to a base station that performs data transmission to one mobile station by using a plurality of cells having different frequency channels like a base station supporting DC-HSDPA (Dual Cell-HSDPA operation). In particular, the present invention relates to a decision control of a frequency channel to be allocated to a cell.

BACKGROUND ART

As one of technologies to increase the communication speed of mobile stations located at cell edges, DC-HSDPA using existing HSDPA (High Speed Downlink Packet Access) has been examined in 3GPP (3rd Generation Partnership Project). DC-HSDPA uses two frequency channels (each of which is 5 MHz) contained in the same frequency band in order to increase the downlink speed. The general idea of DC-HSDPA, which has been currently examined in 3GPP, is explained hereinafter. Note that the details of DC-HSDPA technique, which has been currently proposed, are explained in Non-patent literatures 1 to 3 mentioned below.

In DC-HSDPA, a second serving HS-DSCH cell is referred to as "secondary-serving HS-DSCH cell". Meanwhile, a first serving HS-DSCH cell is simply referred to as "serving HS-DSCH cell". A secondary-serving HS-DSCH cell is dependently formed on condition that a serving HS-DSCH cell is already generated. Note that the serving HS-DSCH cell may be also referred to as "primary carrier" or "base carrier". Meanwhile, the secondary-serving HS-DSCH cell may be also referred to as "secondary carrier" or "extended carrier".

In this specification, in order to clearly distinguish between these two serving HS-DSCH cells, the first serving HS-DSCH cell is referred to as "primary-serving HS-DSCH cell". Further, in the following explanation, the primary-serving HS-DSCH cell and the secondary-serving HS-DSCH cell may be also referred as simply "primary cell" and "secondary cell" respectively.

FIG. 23 shows physical channels used to perform packet communication with DC-HSDPA between a base station (Node B) 91 supporting DC-HSDPA and a mobile station 92. HS-PDSCH is a downlink physical channel for data transmission, and transfers a transport channel HS-DSCH. HS-SCCH is used for transmission of downlink signaling information about HS-DSCH transfer. HS-DPCCH is an uplink physical channel used to transmit, from the mobile station 92 to the base station 91, feedback information about HS-DSCH transfer. This feedback information includes an ACK response regarding a hybrid ARQ (Automatic repeat-request), and a CQI (channel Quality Indication). The uplink DPCH and downlink DPCH are used to transmit/receive control information about DC-HSDPA. Needless to say, other common physical channels indispensable to the generation of the primary cell (such as P-CPICH, SCH, P-CCPCH and S-CCPCH) and common physical channels indispensable to the generation of the secondary cell (such as P-CPICH and SCH) are also used. The formal names of these physical channels and transport channels, which are shown above in abbreviated names, are shown below.

P-CPICH: Primary Common Pilot Channel
DPCH: Dedicated Physical Channel
HS-DPCCH: Dedicated Physical Control Channel (uplink) for HS-DSCH
HS-DSCH: High Speed Downlink Shared Channel
HS-PDSCH: High Speed Physical Downlink Shared Channel
HS-SCCH: Shared Control Channel for HS-DSCH
P-CCPCH: Primary Common Control Physical Channel
S-CCPCH: Secondary Common Control Physical Channel
SCH: Synchronisation Channel When two serving HS-DSCH cells are established in a base station supporting DC-HSDPA, the activation and deactivation of the secondary cell are controlled by the base station. A command (HS-SCCH Order) that is used by the base station to instruct a mobile station (UE) on the activation and deactivation of the secondary cell is transmitted to the mobile station by using HS-SCCH, which is a downlink control channel. Further, the activation and deactivation of the secondary cell may be also changed by transmitting an RRC message from the base station or a radio network controller (RNC) to the mobile station. The details of the message structure and the like of the RRC message are explained in 3GPP TS 25.331 V8.4.0 (2008-09) "Radio Resource Control (RRC)".

Meanwhile, as the indoor voice communication and data transmission have grown in demand owing to the widespread use of mobile phones, the development of compact base stations that can be installed in user's houses, offices, and the likes has been under way. These compact base stations are installed in houses, small-scale offices, and the likes by the owners of the compact base stations, for example, and are connected to an upper layer apparatus on core-network sides by using ADSLs (Asymmetric Digital Subscriber Lines) and fiber-optic lines. In 3GPP, the standardization task has been under way while defining these compact base stations as "Home NodeB" and "Home eNodeB" (for example, see Non-patent literature 4). Note that "Home NodeB" is a compact base station for use in UMTS (Universal Mobile Telecommunications System), while the "Home eNodeB" is a compact base station for use in LTE (Long Term Evolution). In this specification, these compact base stations are referred to as "home base stations", and cells generated by these home base stations are referred to as "home cells".

In base stations used in existing mobile communication networks (cellular communication networks), radio resources to be used in communications between the base stations and mobile stations are determined in advance. In contrast to this, as for the home base stations, a technique to make a home base station autonomously select a radio resource has been examined. Note that the radio resources mean frequency channels in FDMA (Frequency Division Multiple Access) systems, whereas they mean spreading codes in CDMA (Code Division Multiple Access) systems. In the case of 3GPP UMTS (W-CDMA: Wideband-CDMA), the radio resources mean frequency channels and scrambling codes. Further, in the case of 3GPP LTE in which SC-FDMA (Single Carrier FDMA) is used for the uplink and OFDMA (Orthogonal FDMA) is used for the downlink, the radio resources means physical resource blocks. The physical resource block is the fundament unit of the radio resources used for downlink data transmission from a base station to a mobile station, and includes a plurality of OFDM subcarriers in the frequency domain and at least one symbol time in the time domain.

Patent literature 1 discloses a home base station that receives a permission list including a plurality of radio resource (specifically, frequency channel and scrambling code) candidates from an administration system to which the home base station is connected through an xDSL line, a fiber-optic line, or the like, and measures a received signal strength and a CIR (Carrier to Interference Ratio) of a radio signal for each of the radio resource candidates included in the permission list. Further, the home base station disclosed in Patent literature 1 autonomously select a radio resource candidate having the lowest received signal strength and uses the selected radio resource for communication with a mobile station. The reason why the radio resource candidate having the lowest received signal strength is selected is that, by doing so, the interference with cells formed by nearby base stations is believed to be minimized. Further, the home base station disclosed in Patent literature 1 determines the initial transmission power using the selected radio resource based on the previously-measured received signal strength and CIR. Specifically, the initial transmission power is determined with consideration given to the interference level from the nearby base stations so that satisfactory communication service can be provided in a desired communication range (e.g., within 20 m).

CITATION LIST

Patent Literature

Patent literature 1: U.K. Patent Application Publication NO. GB 2428937 A (page 14, line 8 to page 15, line 21)

Non Patent Literature

Non patent literature 1: 3GPP, R1-084029, 25.211 CR0257R3 (Rel-8, B) "Introduction of Dual-Cell HSDPA Operation on Adjacent Carriers", October 2008
Non patent literature 2: 3GPP, R1-084030, 25.212 CR0267R3 (Rel-8, B) "Introduction of Dual-Cell HSDPA Operation on Adjacent Carriers", October 2008
Non patent literature 3: 3GPP, R1-084031, 25.214 CR0497R4 (Rel-8, B) "Introduction of Dual-Cell HSDPA Operation on Adjacent Carriers", October 2008
Non patent literature 4: 3GPP, TR25.820 V8.2.0, "3G Home NodeB Study Item Technical Report", September 2008

SUMMARY OF INVENTION

Technical Problem

The inventors of the present application have considered the feasibility of the support for DC-HSDPA by home base stations. When DC-HSDPA is applied to a home base station, the priority of communication service provided by a secondary cell is believed to be low compared to the communication service provided by the primary cell or nearby cells. A downlink signal transmitted on a secondary cell by the home base station becomes an interfering wave to downlink signals that are transmitted from nearby base stations and received by mobile stations connecting to the nearby cells. Therefore, when occurrence of interference to nearby cells caused by the secondary cell is expected, it is desirable to use a frequency channel different from the frequency channels used in the nearby cells for the secondary cell.

However, whether a mobile stations connecting to a nearby cell can tolerate interference from the secondary cell or not changes according to the load status of this nearby cell. Examples of the situation where the load of nearby cell is large include a situation where a lot of mobile stations connect to the nearby cell, a situation where high-speed communication service (such as HSDPA) having a low spreading ratio is provided, and a situation where the level of an interfering wave from other closely-located cells or other radio systems is large. In such situations, the mobile stations connecting to the nearby cell are already exposed to large interference and/or have a small tolerance to interference. Therefore, the communication quality of mobile stations connecting to the nearby cell could deteriorate due to additional interference caused by the secondary cell.

Note that Patent literature 1 discloses only that the home base station determines a radio resource (frequency channel and scrambling code) based on the received power of a signal wirelessly transmitted from a nearby base station and determines its own transmission power based on the CIR of the signal wirelessly transmitted from a nearby cell. That is, Patent literature 1 does not disclose anything about the determination of a frequency channel to be allocated to a secondary cell of DC-HSDPA that is performed based on the load status of a nearby cell.

The present invention has been made based on the above-described consideration, and an object thereof is to suppress the interference to a nearby cell caused by a base station that performs data transmission to a mobile station by using a first cell and a second cell that is dependently formed under condition of the formation of the first cell by using a frequency channel different from that of the first cell like DC-HSDPA.

Solution to Problem

A base station apparatus in accordance with a first aspect of the present invention includes a radio communication unit and a control unit. The radio communication unit is capable of forming first cell and a second cell that is dependently formed under condition of the formation of the first cell by using a frequency channel different from that of the first cell, and transmitting a physical channel for data transmission in each of the first and second cells. Further, the control unit is adapted to determine a frequency channel available to the second cell based on a load status of a nearby cell formed by a nearby base station.

A method in accordance with a second aspect of the present invention is a control method of a base station apparatus capable of forming a first cell and a second cell that is dependently formed under condition of the formation of the first cell by using a frequency channel different from that of the first cell, and transmitting a physical channel for data transmission in each of the first and second cells. The method includes the following steps (a) and (b):
(a) a step of determining a frequency channel available to the second cell based on a load status of a nearby cell formed by a nearby base station; and
(b) a step of transmitting a physical channel for data transmission in the second cell formed by using the frequency channel available to the second cell.

A communication system in accordance with a third aspect of the present invention includes first and second base stations. The first base station is capable of forming a first cell and a second cell that is dependently formed under condition of the formation of the first cell by using a frequency channel different from that of the first cell, and transmitting a physical channel for data transmission in each of the first and second cells. The second base station is capable of forming a nearby cell in a vicinity of the first and second cells. Further, the first base station determines a frequency channel available to the second cell based on a load status of the nearby cell.

A program in accordance with a fourth aspect of the present invention is a program that causes a computer to perform control processing of a base station apparatus. The base station apparatus is capable of forming a first cell and a second cell that is dependently formed under condition of the formation of the first cell by using a frequency channel different from that of the first cell, and transmitting a physical channel for data transmission in each of the first and second cells. The control processing that the program causes a computer to perform includes the following steps (a) and (b):
(a) a step of obtaining a load status of a nearby cell, the nearby cell being formed by a nearby base station; and
(b) a step of determining a frequency channel available to the second cell based on the load status of the nearby cell.

Advantageous Effects of Invention

In accordance with the above-described first to fourth aspects of the present invention, the frequency channel used in the second cell is determined based on the load status of the nearby cell. Therefore, it is possible to suppress the interference to the nearby cell caused by the dependently-formed second cell.

DESCRIPTION OF EMBODIMENTS

Specific exemplary embodiments to which the present invention is applied are explained hereinafter with reference to the drawings. The same signs are assigned to the same components throughout the drawings, and duplicated explanation is omitted as appropriate for simplifying the explanation.

First Exemplary Embodiment

Figure 1:
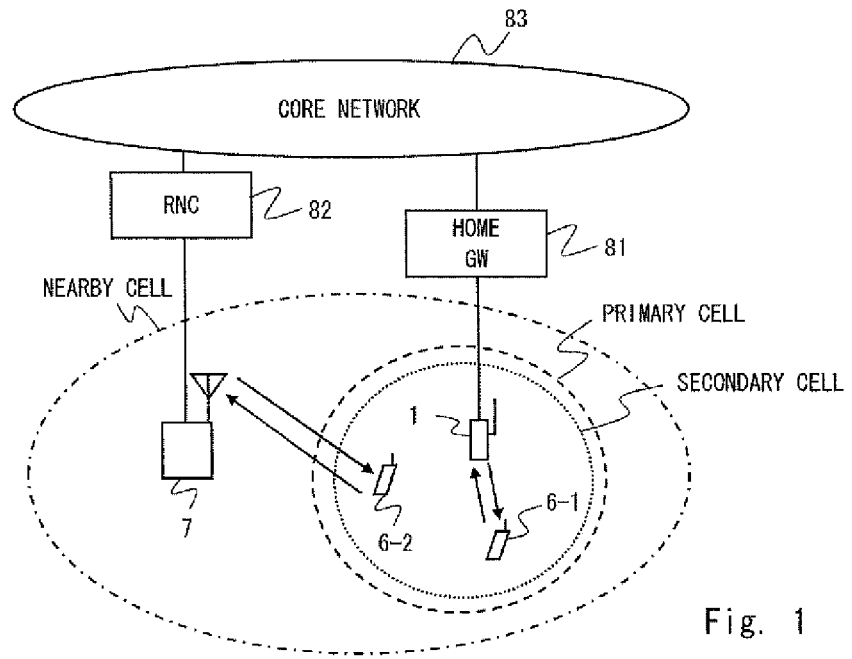
FIG. 1 is a configuration diagram of a radio communication system in accordance with a first exemplary embodiment of the invention.

FIG. 1 is a configuration example of a radio communication system in accordance with this exemplary embodiment. Note that the following explanation is made on the assumption that a radio communication system in accordance with this exemplary embodiment is a radio communication system of a FDD (Frequency Division Duplex)-CDMA type, more particularly, of a W-CDMA type. Firstly, components shown in FIG. 1 are explained.

The home base station 1 is connected to a core network 83 of a mobile communications company through a home gateway (home GW) 81, and relays traffic between a mobile station 6-1 and the core network 83. The home base station 1 is used in a state where the home base station 1 connected, for example, to a fixed communication line such as ADSL (Asymmetric Digital Subscriber Line), an optical fiber, and a coaxial cable, and is connected to the home GW 81 through an IP (Internet Protocol) network such as an IP communication network and the Internet.

The home base station 1 is a base station supporting DC-HSDPA, and generates a primary cell and a secondary cell having mutually different frequency channels. The home base station 1 transmits common physical channels (such as P-CPICH and SCH) used to form the primary and secondary cells, and also transmits a physical channel (HS-PDSCH) through which HS-DSCH is conveyed in each of the two serving HS-DSCH cells.

Further, the home base station 1 is able to determine a frequency channel of the secondary cell based on a load status of a nearby cell. Specifically, the home base station 1 receives restriction information that is transmitted from a nearby base station 7 through the core network 83 or transmitted directly and wirelessly from the nearby base station 7, and determines a frequency channel of the secondary cell with consideration given to the instruction provided by the restriction information. The restriction information is information that is used to restrict the allocation of the same frequency channel as that used in the nearby cell to the secondary cell. Note that specific examples of the procedure to determine a frequency channel of a secondary cell are described later.

The nearby base station 7 generates a nearby cell, and communicates with a mobile station 6-2. In the example shown in FIG. 1, the nearby cell is a macro cell at an upper hierarchy that is formed so as to cover the home cell (primary and secondary cells) generated by the home base station 1. The nearby base station 7 is connected to the core network 83 through a radio network controller (RNC) 82, and relays traffic between the mobile station 6-2 and the core network 83.

Further, as described previously, the nearby base station 7 in accordance with this exemplary embodiment generates restriction information and transmits it to the home base station 1 in order to control the frequency channel to be allocated to the secondary cell of the home base station 1. Note that as described later, the generation of the restriction information may be performed by a processing apparatus (not shown) located in the RNC 82 or the core network.

The home GW 81 transfers information between the home base station 1 and the core network 83. The RNC 82 performs communication control and information transfer between the mobile station 6-2 located in the nearby cell formed by the nearby base station 7 and the core network 83.

Note that although only one secondary cell is shown in FIG. 1, two or more secondary cells may be formed by the home base station 1. This exemplary embodiment is explained on the assumption that the home base station 1 forms only one secondary cell for the sake of explanation.

Next, specific examples of the procedure to determine a frequency channel of a secondary cell based on restriction information as well as configuration examples of the home base station 1 and the nearby base station 7 are explained hereinafter.

Figure 2:
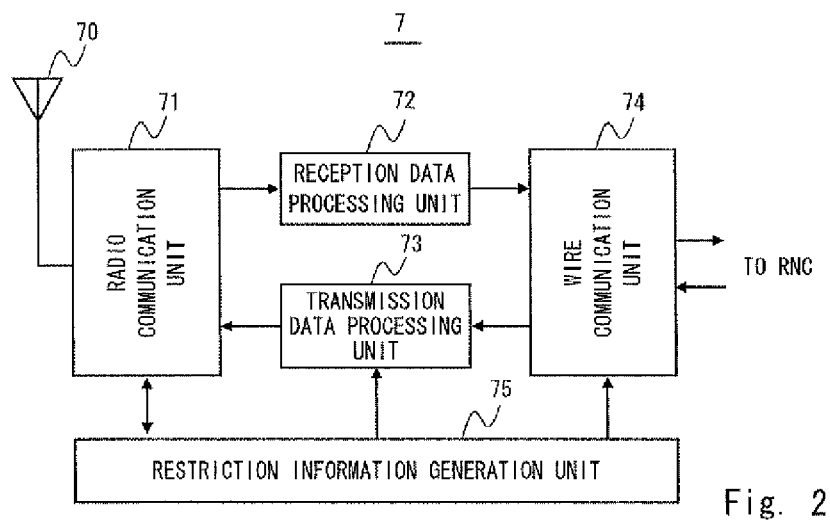
FIG. 2 is a block diagram showing a configuration example of a nearby base station included in a radio communication system in accordance with the first exemplary embodiment of the invention.

FIG. 2 is a block diagram showing a configuration example of the nearby base station 7. In FIG. 2, a radio communication unit 71 receives an uplink signal transmitted from the mobile station 6-2, through an antenna 70. A reception data processing unit 72 restores received data by performing various processes such as inverse spreading, RAKE combining, deinterleaving, channel decoding, and error correction on the received uplink signal. The obtained reception data is sent to the RNC 82 through a wire communication unit 74.

A transmission data processing unit 73 obtains, from the wire communication unit 74, transmission data to be transmitted toward the mobile station 6-2, and generates a transport channel by performing error correction encoding, rate matching, interleaving, and the like. Further, the transmission data processing unit 73 generates a radio frame by adding control information such as a TPC (Transmit Power Control) bit to a data series of the transport channel. Further, the transmission data processing unit 73 generates a transmission symbol string by performing spreading processing and symbol mapping. The radio communication unit 71 generates a downlink signal by performing various processes such as quadrature modulation, frequency conversion, and signal amplification on the transmission symbol string, and transmits the generated downlink signal to the mobile station 6-2.

A restriction information generation unit 75 measures the load status of a nearby cell and determines whether the load of the nearby cell exceeds a predetermined criterion or not. When the load of the nearby cell exceeds the predetermined criterion, the restriction information generation unit 75 restricts the allocation of the frequency channel that is used for the downlink signal transmission of the nearby cell to the secondary cell. The restriction information generation unit 75 generates restriction information and transmits it to the home base station 1 in order to restrict the allocation of a frequency channel. The restriction information is information that is used to perform "prohibition" or "cancellation of prohibition" to allocate the frequency channel used for the downlink signal transmission in the nearby cell to the secondary cell. The restriction information contains information indicating the prohibition of allocation or the cancellation of prohibition, and information used to identify the frequency channel to be prohibited or canceled. The restriction information may be transmitted through the core network 83, or transmitted by using a control channel (broadcast channel) wirelessly transmitted by the communication unit 71.

The restriction information generation unit 75 measures, for example, at least one of the total downlink transmission power Ptx and the total uplink received power (RTWP: Received Total Wideband Power) in order to determine the load status of the nearby cell. Note that the restriction information generation unit 75 does not necessarily have to actually measure Ptx and RTWP. That is, the restriction information generation unit 75 may obtain the control target value of Ptx and RTWP. Further, the restriction information generation unit 75 may obtain other measurement values relating to Ptx and RTWP (e.g., transmission power density and received power density). Further, the restriction information generation unit 75 may obtain the usage rate of spreading code (the ratio of spreading codes that are actually used to the entire spreading codes) in the nearby cell. Further, the restriction information generation unit 75 may obtain a measurement value measured by the mobile station 6-2 such as the received power RSCP (Received Signal Code Power) of a pilot channel (P-CPICH), the total received power RSSI (Received Signal Strength Indicator), or RSCP/RSSI.

Note that FIG. 2 shows an example in which the nearby base station 7 generates the restriction information. However, the generation of restriction information may be performed by a processing apparatus located in the RNC 82 or the core network 83. In this case, the nearby base station 7 may transmit measurement information such as Ptx and RTWP to the apparatus that generates restriction information.

Figure 3:
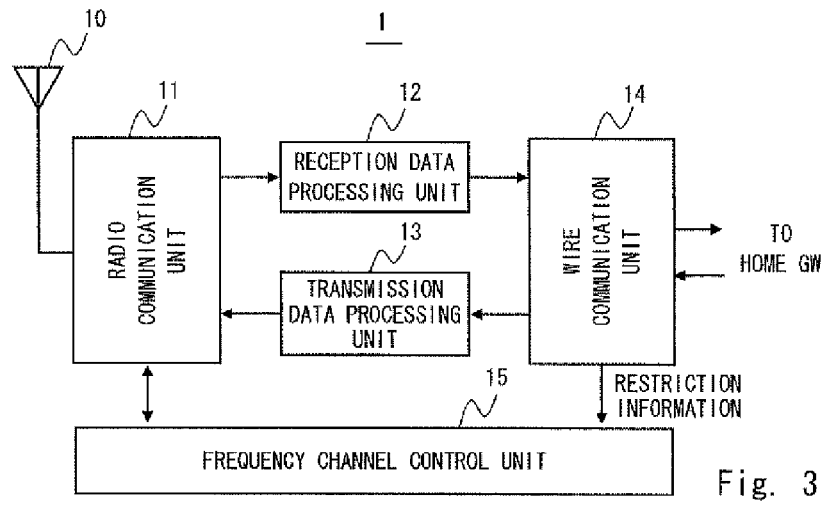
FIG. 3 is a block diagram showing a configuration example of a home base station included in a radio communication system in accordance with the first exemplary embodiment of the invention.

Next, a configuration example of the home base station 1 is explained. FIG. 3 is a block diagram showing a configuration example of the home base station 1. In FIG. 3, a radio communication unit 11 receives an uplink signal transmitted from the mobile station 6-1, through an antenna 10. A reception data processing unit 12 restores received data from a received uplink signal in a similar manner to that of the above-described reception data processing unit 72. The obtained reception data is transferred to the home GW 81 through a wire communication unit 14. Note that it has been examined to provide a home base station with an RNC function so that the home base station is able to perform autonomous radio resource control. Accordingly, the home base station 1 may have an RNC function. In the case where the home base station 1 has an RNC function, when the received data obtained by the reception data processing unit 12 is a location registration request or a radio channel establishment request from the mobile station 6-1, the reception data is sent to the RNC function unit (not shown) of the home base station 1 to perform these controls.

A transmission data processing unit 13 obtains, from the wire communication unit 14, transmission data to be transmitted toward the mobile station 6-2, and generates a transmission symbol string through similar processing steps to those of the above-described transmission data processing unit 73. The radio communication unit 11 generates a downlink signal by performing various processes such as quadrature modulation, frequency conversion, and signal amplification on the transmission symbol string, and transmits the generated downlink signal to the mobile station 6-1.

A frequency channel control unit 15 determines a frequency channel to be allocated to the secondary cell. In this process, the frequency channel control unit 15 obtains restriction information generated by the nearby base station 7, the RNC 82 or other processing apparatus, and excludes a frequency channel that is prohibited from being allocated by the restriction information from the frequency channel candidates that can be allocated to the secondary cell.

Figure 4:
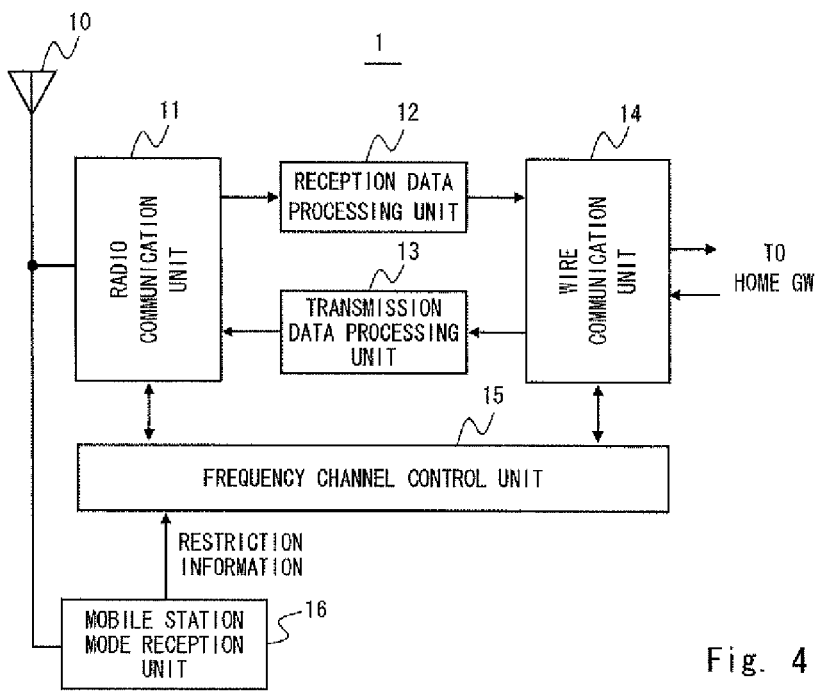
FIG. 4 is a block diagram showing a configuration example of a home base station included in a radio communication system in accordance with the first exemplary embodiment of the invention.

The reception of restriction information by the home base station 1 may be performed through the core network 83, or performed by receiving a control channel (broadcast channel) wirelessly transmitted by the nearby base station 7. In the case of receiving a control channel transmitted by the nearby base station 7, a mobile station mode reception unit 16 may be disposed in the home base station 1 as shown in FIG. 4. The mobile station mode reception unit 16 receives a radio signal transmitted from the nearby base station. Note that the receiving circuit of the radio communication unit 11 may be also used as the receiving circuit of the mobile station mode reception unit 16.

Figure 5:
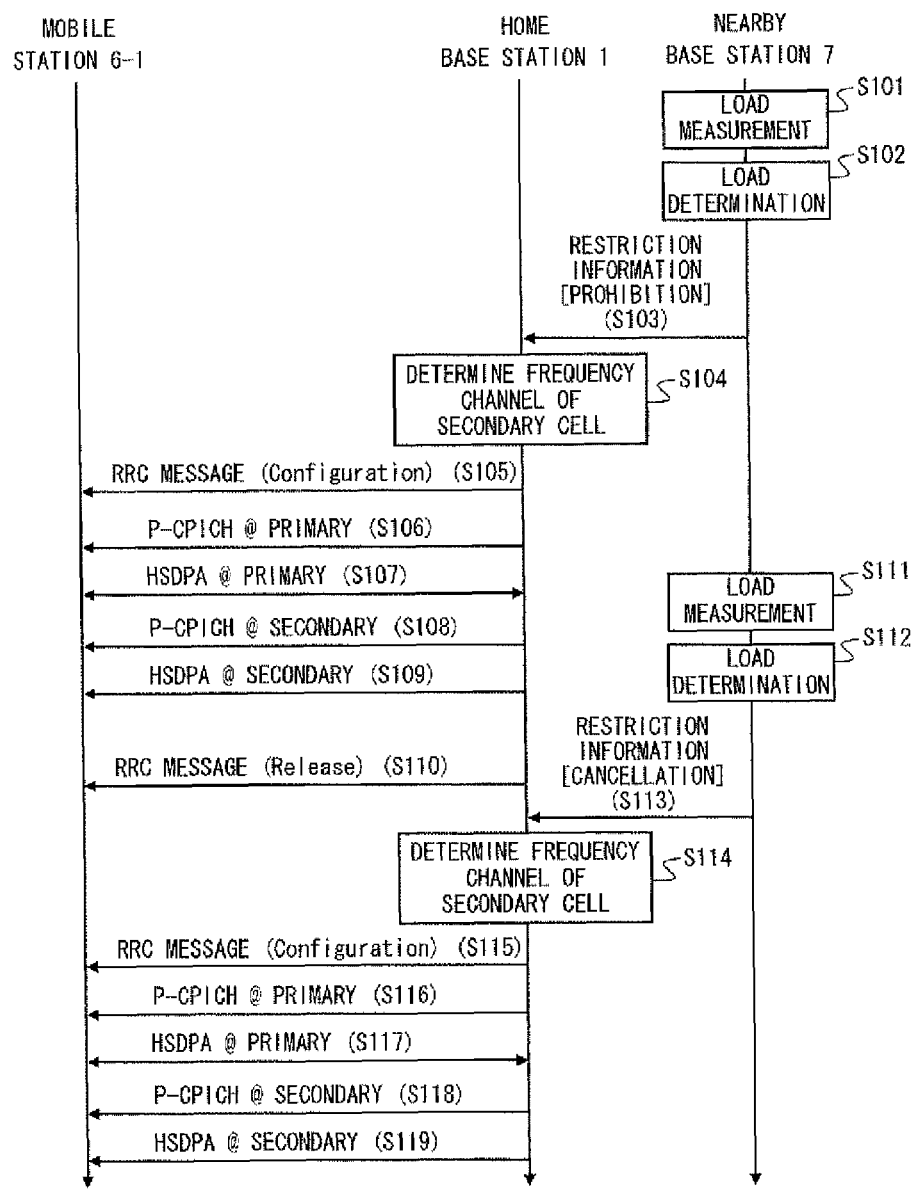
FIG. 5 is a sequence diagram showing an example of a procedure to determine a frequency channel of a secondary cell in accordance with the first exemplary embodiment of the invention.

Next, a specific example of a procedure to determine a frequency channel to be allocated to a secondary cell is explained hereinafter with reference to FIGS. 5 to 7. FIG. 5 is a sequence diagram showing interactions between the nearby base station 7, the home base station 1, and the mobile station 6-1 that are performed when a frequency channel to be allocated to the secondary cell is determined.

In a step S101, the nearby base station 7 carries out a measurement to obtain measurement information relating to the load of a nearby cell. In a step S102, the nearby base station 7 determines the load of the nearby cell. When the load of the nearby cell is determined to be larger than a predetermined criterion, the nearby base station 7 transmits restriction information (step S103). The restriction information transmitted in this step indicates the prohibition of the allocation of the frequency channel used in the nearby cell to the secondary cell.

In a step S104, the home base station 1 determines a frequency channel to be allocated to the secondary cell with consideration given to the restriction information. Specifically, home base station 1 excludes the frequency channel of which the use is prohibited by the restriction information, and selects a frequency channel for the secondary cell from the remaining frequency channel candidates.

In a step S105, the home base station 1 notifies configuration information of the secondary cell to the mobile station 6-1. The configuration information contains information indicating the frequency channel to be used in the secondary cell. The notification of the configuration information may be performed, for example, by transmitting RRC MESSAGE (Configuration).

In steps S106 and S107, a pilot channel (P-CPICH) and a group of physical channels relating to HSDPA of the primary cell are transmitted. The physical channel group indicated as "HSDPA @ PRIMARY" in the figure includes a downlink HS-SCCH, a downlink HS-PDSCH, and an uplink HS-DPCCH. In steps S108 and S109, a pilot channel (P-CPICH) and a group of physical channels relating to HSDPA of the secondary cell are transmitted. The physical channel group indicated as "HSDPA @ SECONDARY" in the figure includes a downlink HS-SCCH and a downlink HS-PDSCH. Note that the steps S106 to S109 are shown in the illustrated order just for the sake of convenience, and these physical channels are transmitted according to a predetermined timing relation with respect to SCH.

A step S110 indicates the stop of HSDPA service by the secondary cell. For example, the home base station 1 may notifies the stop of HSDPA service by the secondary cell by transmitting RRC MESSAGE (Release) to the mobile station 6-1.

In steps S111 and S112, the nearby base station 7 obtains measurement information and determines the load of the nearby cell in a similar manner to the steps S101 and S102. When the load of the nearby cell is determined to be smaller than the predetermined criterion, the nearby base station 7 transmits restriction information (step S113). The restriction information transmitted in this step indicates the "cancellation" of the allocation prohibition setting of the frequency channel notified in the step S103.

In a step S114, the home base station 1 determines a frequency channel to be allocated to the secondary cell with consideration given to the restriction information. Specifically, since the allocation prohibition of the frequency channel used in the nearby cell is cancelled, the home base station 1 selects a frequency channel for the secondary cell from among the frequency channel candidates including the same frequency channel as that of the nearby cell. Steps S115 to S119 are similar to the above-described steps S105 to S109.

Figure 6:
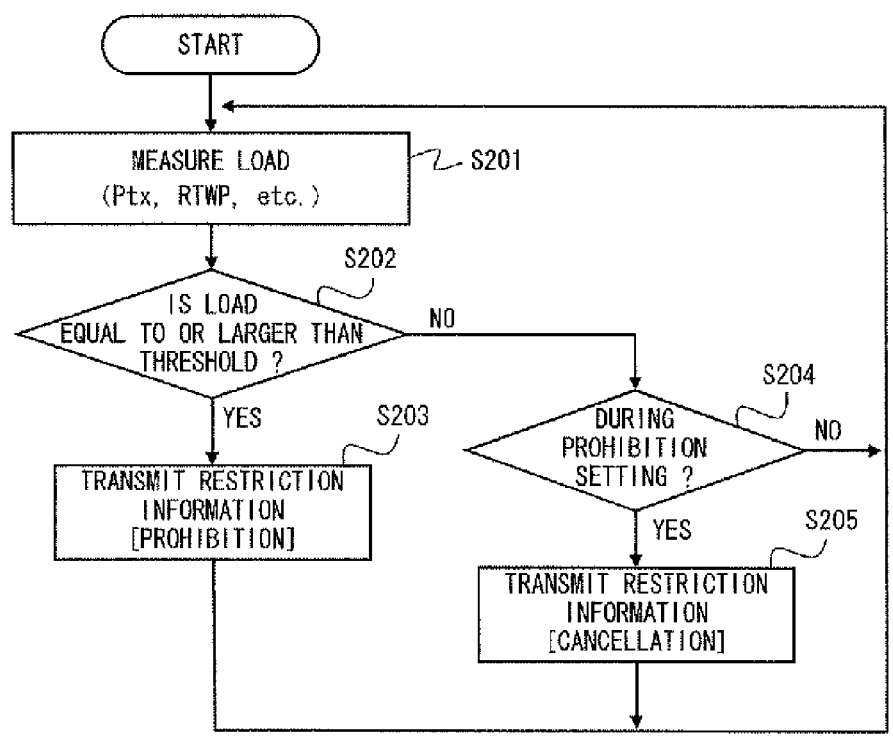
FIG. 6 is a flowchart showing a specific example of a restriction information generation process performed by a nearby base station.

FIG. 6 is a flowchart regarding a generation process of restriction information performed by the nearby base station 7. In a step S201, the restriction information generation unit 75 measures the load of a nearby cell. In a step S202, the restriction information generation unit 75 determines whether the measured load exceeds a predetermined threshold or not.

When the measured load exceeds the predetermined threshold (Yes at step S202), the restriction information generation unit 75 transmits restriction information indicating the prohibition of the use of a same frequency channel as that used in the nearby cell to the home base station 1 (step S203). For example, in the case where the total transmission power Ptx and the total received power RTWP are used for the load determination, the restriction information generation unit 75 may prohibit the use of the same frequency channel as that used in the nearby cell when at least one of Ptx and RTWP exceeds its respective threshold Pth or RTWPth.

On the other hand, when the measured load is smaller than the predetermined threshold (No at step S202), the restriction information generation unit 75 determines whether the use prohibition setting of the frequency channel is effective or not. When the use prohibition setting is effective (Yes at step S204), the restriction information generation unit 75 transmits restriction information indicating the "cancellation" of the use prohibition of the same frequency channel as that used in the nearby cell to the home base station 1. For example, in the case where the total transmission power Ptx and the total received power RTWP are used for the load determination, the restriction information generation unit 75 may cancel the use prohibition of the frequency channel when Ptx and RTWP are both lower than their respective thresholds Pth and RTWPth.

Figure 7:
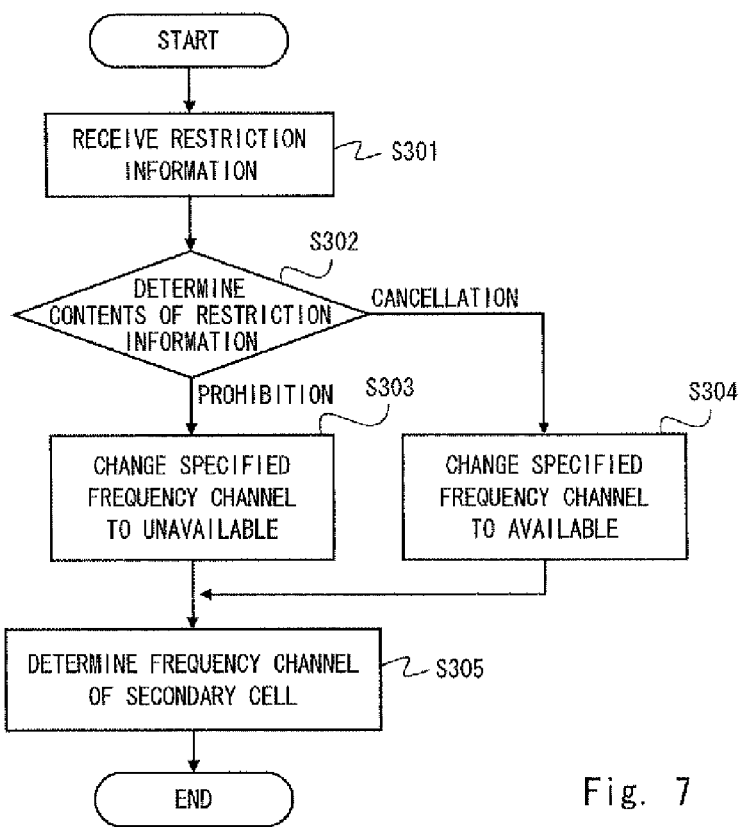
FIG. 7 is a flowchart showing a specific example of a procedure to determine a frequency channel of a secondary cell performed by a home base station.

FIG. 7 is a flowchart regarding a process to determine a frequency channel for secondary cell performed by the home base station 1. In a step S301, the frequency channel control unit 15 receives restriction information. In a step S302, the frequency channel control unit 15 determines the contents of the restriction information. When the frequency channel control unit 15 receives restriction information [prohibition], the frequency channel control unit 15 prohibits the use of the frequency channel specified by the restriction information in the secondary cell (step S303). On the other hand, when restriction information [cancellation] is received, the frequency channel control unit 15 cancels the use prohibition of the frequency channel specified by the restriction information in the secondary cell.

The frequency channel control unit 15 administers the permission/denial of the use of a frequency channel based on the restriction information. In a step S305, the frequency channel control unit 15 selects a frequency channel to be allocated to the secondary cell from among the frequency channel candidates other than the frequency channel of which the use is prohibited by the restriction information. Note that if there are a plurality of frequency channel candidates that can be allocated to the secondary cell, the frequency channel control unit 15 may select one of them as appropriate. For example, the frequency channel control unit 15 may select one of allocatable frequency channel candidates in a random fashion. Alternatively, the home base station 1 may operate as a mobile station and measure RSCP, RSSI, and investigate the use status of each frequency channel in other cells. Then, the frequency channel control unit 15 may select a frequency channel that is used in a cell having the smallest load as the frequency channel for the secondary cell. Further, when there is a frequency channel that is not used by any nearby cell, the frequency channel control unit 15 may select that frequency channel as the frequency channel for the secondary cell.

As described above, the home base station 1 in accordance with this exemplary embodiment determines a frequency channel to be allocated to the secondary cell based on the load status of a nearby cell by referring to restriction information transmitted from the nearby base station 7, the RNC 82, or the like. As a result, the home base station 1 can suppress the interference to the nearby cell caused by the secondary cell.

Incidentally, the above-described process to determine a frequency channel to be allocated that is performed by the frequency channel control unit 15 may be implemented by using a semiconductor processing apparatus such as an ASIC and a DSP. Further, the process to determine a frequency channel to be allocated may be implemented by making a computer such as a microprocessor execute a control program describing the processing steps explained above with reference to FIG. 7. This control program can be stored in various types of storage media, and/or can be transmitted through communication media. Note that examples of the storage media include a flexible disk, a hard disk, a magnetic disk, magneto-optic disk, a CD-ROM, a DVD, a ROM cartridge, a RAM memory cartridge with a battery backup, a flash memory cartridge, and a nonvolatile RAM cartridge. Further, examples of the communication media include a wire communication medium such as a telephone line, a radio communication medium such as a microwave line, and the Internet.

Second Exemplary Embodiment

A radio communication system in accordance with this exemplary embodiment includes a home base station 2 and a nearby base station 7. The network configuration may be similar to that shown in FIG. 1, and therefore its graphical illustration is omitted. The nearby base station 7 in accordance with this exemplary embodiment is different from the above-described nearby base station in accordance with the first exemplary embodiment in that the nearby base station 7 of this exemplary embodiment transmits measurement information relating to the load of a nearby cell to the home base station 2 without generating any restriction information. Further, the home base station 2 is different from the above-described home base station 1 in accordance with the first exemplary embodiment in that the home base station 2 determines the load of a nearby cell by using measurement information received from the nearby base station 7. The nearby base station 7 may transmits the measurement information through the core network 83, or wirelessly transmits the measurement information by using a control channel (broadcast channel).

Figure 8:
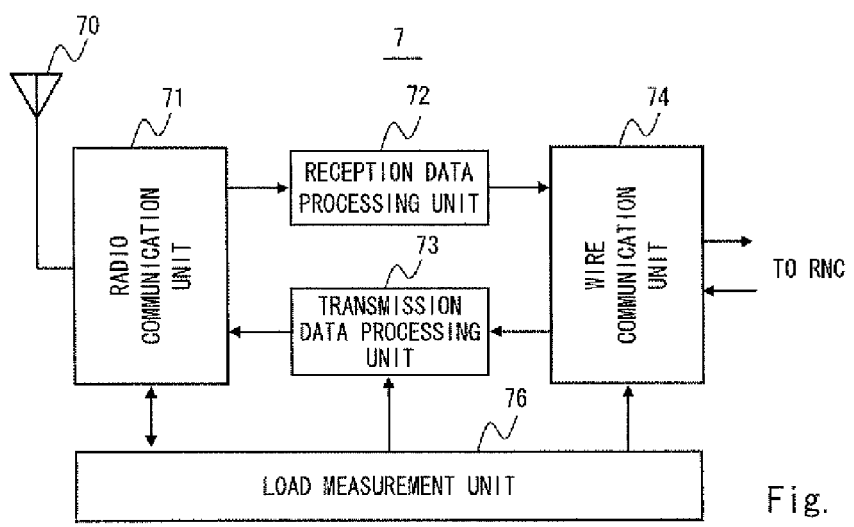
FIG. 8 is a block diagram showing a configuration example of a nearby base station included in a radio communication system in accordance with a second exemplary embodiment of the invention.

FIG. 8 is a block diagram showing a configuration example of the nearby base station 7 in accordance with this exemplary embodiment. The functions and operations of an antenna 70, a radio communication unit 71, a reception data processing unit 72, a transmission data processing unit 73, and a wire communication unit 74 shown in FIG. 8 may be similar to those of the corresponding components shown in FIG. 2.

A load measurement unit 76 measures the load status of a nearby cell and transmits the obtained measurement information to the home base station 2. The object(s) to be measured by the load measurement unit 76 may be similar to that of the above-described restriction information generation unit 75.

Figure 9:
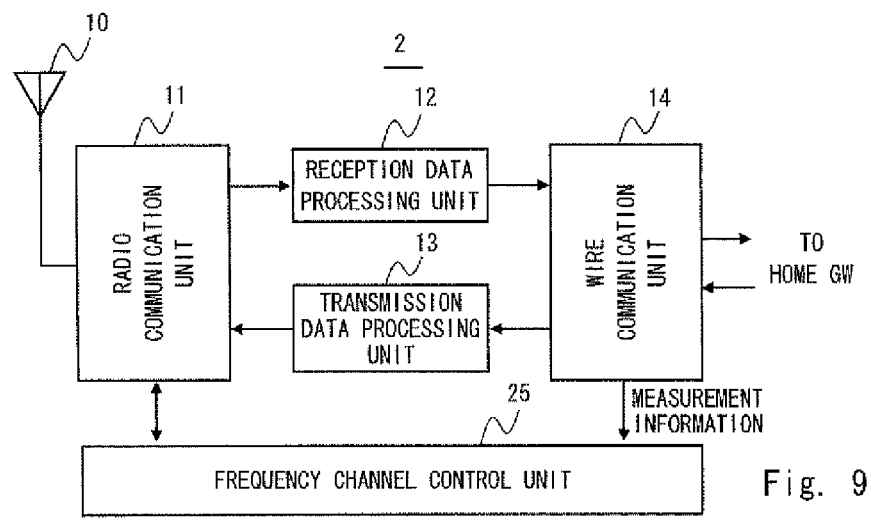
FIG. 9 is a block diagram showing a configuration example of a home base station included in a radio communication system in accordance with the second exemplary embodiment of the invention.

FIG. 9 is a block diagram showing a configuration example of the home base station 2. The functions and operations of an antenna 10, a radio communication unit 11, a reception data processing unit 12, a transmission data processing unit 13, and a wire communication unit 14 shown in FIG. 9 may be similar to those of the corresponding components shown in FIG. 3.

A frequency channel control unit 25 determines a frequency channel to be allocated to the secondary cell. In this process, the frequency channel control unit 25 obtains measurement information from the nearby base station 7 and determines the load status of the nearby cell based on the measurement information. Then, when the frequency channel control unit 25 determines that the load of the nearby cell exceeds a predetermined criterion, the frequency channel control unit 25 excludes the same frequency channel as that used in the nearby cell from the frequency channel candidates that can be allocated to the secondary cell.

Figure 10:
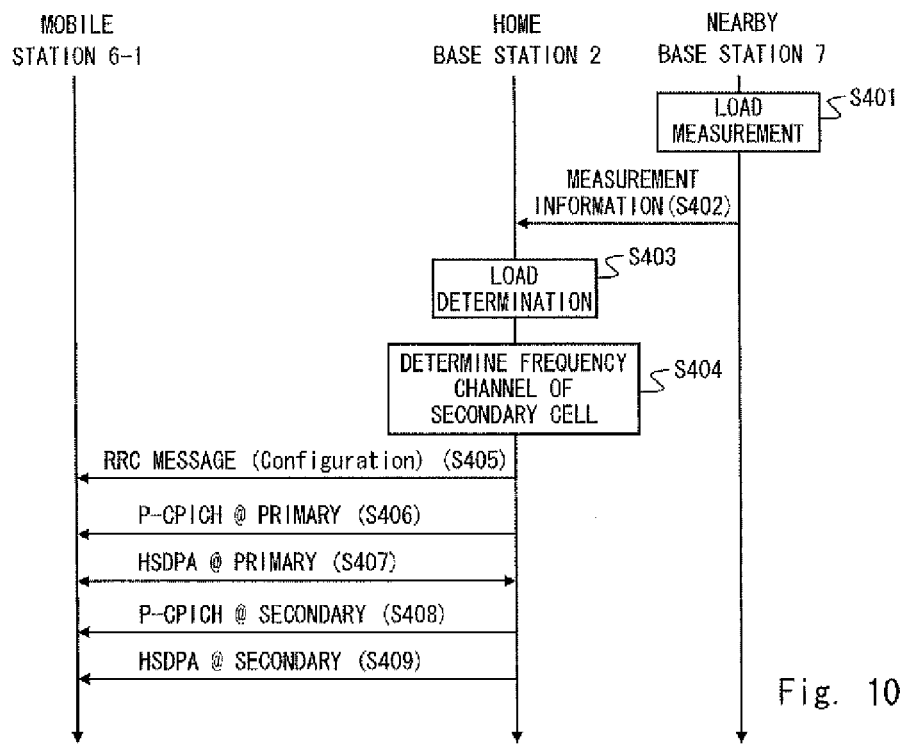
FIG. 10 is a sequence diagram showing an example of a procedure to determine a frequency channel of a secondary cell in accordance with the second exemplary embodiment of the invention.

Next, a specific example of a procedure to determine a frequency channel to be allocated to a secondary cell is explained hereinafter with reference to FIGS. 10 to 12. FIG. 10 is a sequence diagram showing interactions between the nearby base station 7, the home base station 2, and the mobile station 6-1 that are performed when a frequency channel to be allocated to the secondary cell is determined.

In a step S401, the nearby base station 7 carries out a measurement to obtain measurement information relating to the load of a nearby cell. In a step S402, the nearby base station 7 transmits the measurement information to the home base station 2.

In a step S403, the home base station 2 determines the load of the nearby cell by using the received measurement information. When the load of the nearby cell is determined to be larger than a predetermined criterion, the home base station 2 prohibits the allocation of the frequency channel used in the nearby cell to the secondary cell.

In a step S404, the home base station 2 determines a frequency channel to be allocated to the secondary cell with consideration given to the determination result in the step S403. Specifically, the home base station 2 excludes the frequency channel that is prohibited from being allocated due to the large load of the nearby cell, and selects a frequency channel for the secondary cell from the remaining frequency channel candidates. Steps S405 to S409 are similar to the above-described steps S105 to S109.

Incidentally, when there are two or more nearby cells as well as two or more nearby base stations 7 and/or when the number of frequency channel candidates that can be allocated to the secondary cell is limited, there is a possibility that all the frequency channel candidates are prohibited from being allocated based on the determination made in the step S403. In this case, the home base station 2 may stop DC-HSDPA, and therefore may provide ordinary HSDPA service using only the primary cell. Alternatively, the home base station 2 may relax the determination condition and determine the load status of the nearby cell again with the relaxed determination condition. Further, the home base station 2 may select a frequency channel that is used in a cell having the smallest load.

Figure 11:
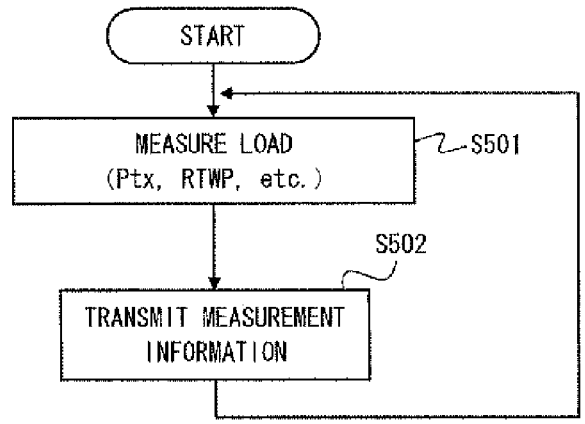
FIG. 11 is a flowchart showing a specific example of a control information generation process performed by a nearby base station.

FIG. 11 is a flowchart regarding a measurement information generation process performed by the nearby base station 7. In a step S501, the load measurement unit 76 measures the load of a nearby cell. In a step S502, the load measurement unit 76 transmits the measurement information obtained by the measurement to the home base station 2.

Figure 12:
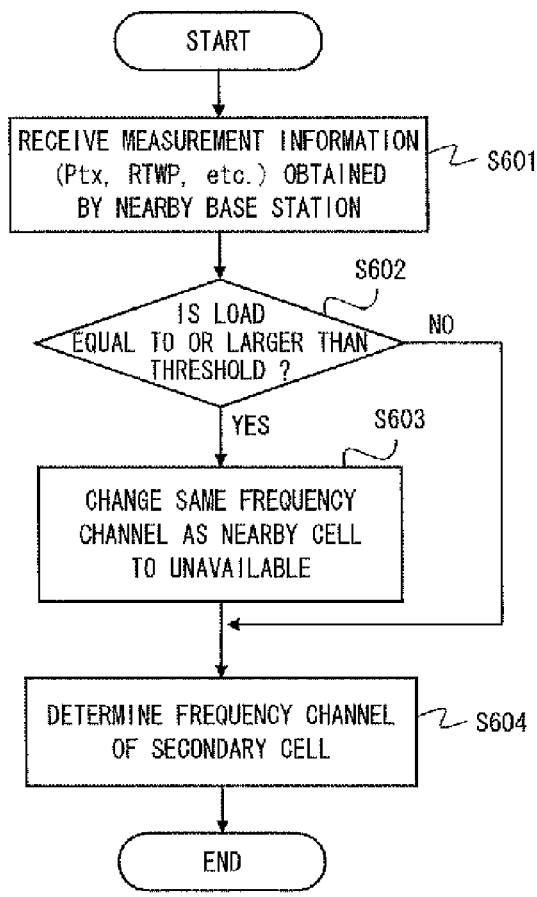
FIG. 12 is a flowchart showing a specific example of a procedure to determine a frequency channel of a secondary cell performed by a home base station.

FIG. 12 is a flowchart regarding a process to determine a frequency channel for secondary cell performed by the home base station 2. In a step S601, the frequency channel control unit 25 receives the measurement information (Ptx, RTWP, etc.) from the nearby base station 7. In a step S602, the frequency channel control unit 25 refers to the received measurement information, and thereby determines whether the load of the nearby cell exceeds a predetermined threshold or not.

When the load of the nearby cell exceeds the predetermined threshold (Yes at step S602), the frequency channel control unit 25 prohibits the use of the same frequency channel as that used in the nearby cell in the secondary cell (step S603).

In a step S604, the frequency channel control unit 25 selects a frequency channel to be allocated to the secondary cell from among the frequency channel candidates other than the frequency channel of which the use is prohibited in the step S603.

As described above, the home base station 2 in accordance with this exemplary embodiment determines the load of the nearby cell by referring to the measurement information (Ptx, RTWP, etc.) relating to the load of the nearby cell that is measured by the nearby base station 7, and determines a frequency channel to be allocated to the secondary cell based on this determination result. As a result, the home base station 2 can suppress the interference to the nearby cell caused by the secondary cell.

As described above with the first exemplary embodiment, the frequency channel determination process performed by the frequency channel control unit 25 may be implemented by using an ASIC, a DSP, a microprocessor, or the like.

Third Exemplary Embodiment

Figure 13:
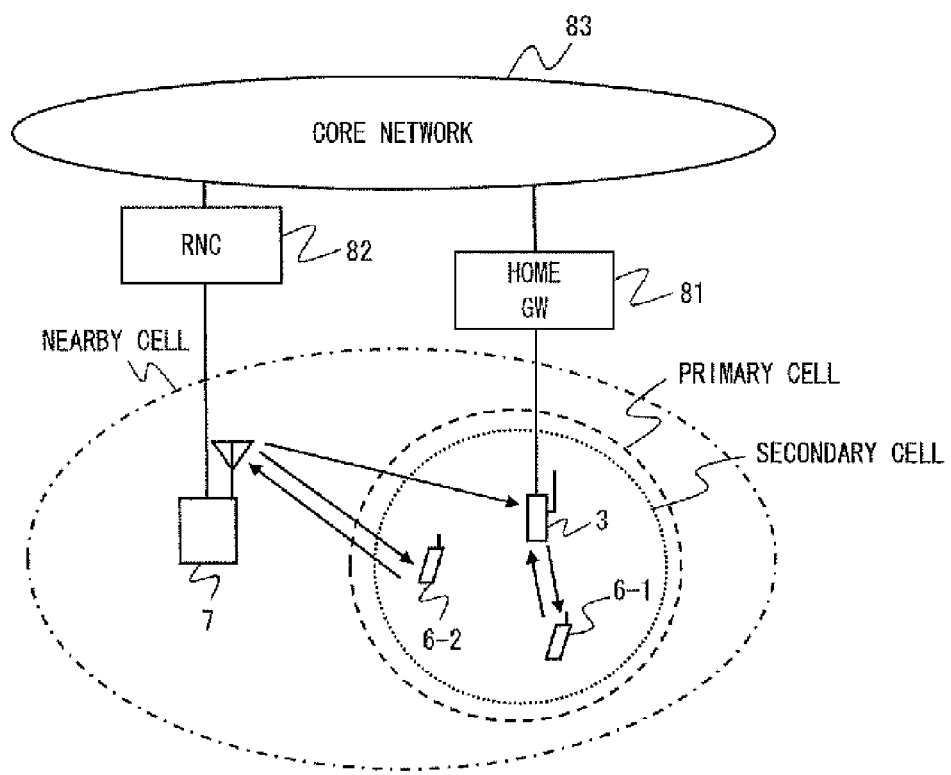
FIG. 13 is a configuration diagram of a radio communication system in accordance with a third exemplary embodiment of the invention.

FIG. 13 is a configuration diagram of a radio communication system including a home base station 3 in accordance with this exemplary embodiment. The home base station 3 measures a radio signal transmitted by a nearby base station 7, and autonomously determines the load status of the nearby cell.

Figure 14:
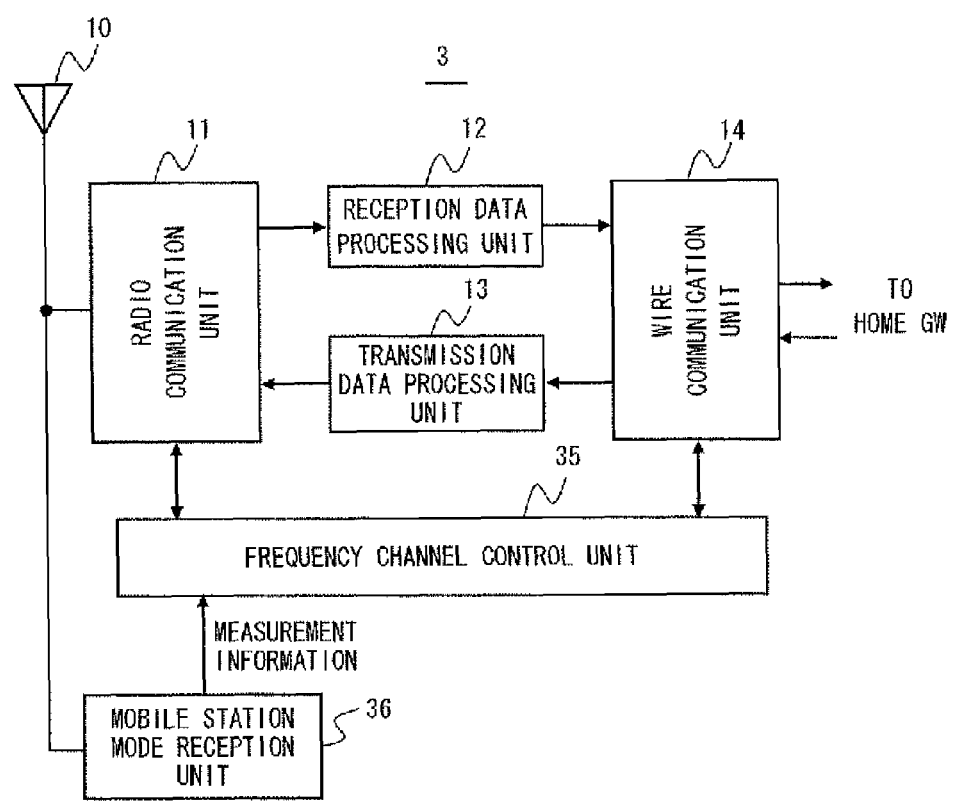
FIG. 14 is a block diagram showing a configuration example of a home base station included in a radio communication system in accordance with the third exemplary embodiment of the invention.

FIG. 14 is a block diagram showing a configuration example of the home base station 3. The functions and operations of an antenna 10, a radio communication unit 11, a reception data processing unit 12, a transmission data processing unit 13, and a wire communication unit 14 shown in FIG. 14 may be similar to those of the corresponding components shown in FIG. 3.

A mobile station mode reception unit 36 receives a radio signal transmitted from the nearby base station 7, and generates measurement information relating to the load status of the nearby cell. Note that the receiving circuit of the radio communication unit 11 may be also used as the receiving circuit of the mobile station mode reception unit 36. For example, the mobile station mode reception unit 36 obtains RSSI (Received Signal Strength Indicator) of a frequency channel used by the nearby cell and RSCP (Received Signal Code Power) of P-CPICH of the nearby cell. Further, the mobile station mode reception unit 36 may calculates other measurement values such as RSCP/RSSI from RSSI and RSCP. To measure RSSI, RSCP, and the like, the transmitting operation of the home base station 3 may be intermittently stopped so that the mobile station mode reception unit 36 selectively performs receiving operations during the time periods in which no transmission is performed by the home base station 3.

A frequency channel control unit 35 determines a frequency channel to be allocated to the secondary cell. In this process, the frequency channel control unit 35 determines the load status of the nearby cell based on the measurement information such as RSCP, RSSI and RSCP/RSSI obtained by the mobile station mode reception unit 36. Then, when the frequency channel control unit 35 determines that the load of the nearby cell exceeds a predetermined criterion, the frequency channel control unit 35 excludes the same frequency channel as that used in the nearby cell from the frequency channel candidates that can be allocated to the secondary cell. Further, the frequency channel control unit 35 may select a frequency channel that is used in a cell having the smallest load. Further, when there is a frequency channel that is not used by any nearby cell, the frequency channel control unit 35 may select that frequency channel as the frequency channel for the secondary cell.

An example of the determination condition that is used to determine the use prohibition of a frequency channel by using measurement information such as RSCP, RSSI and RSCP/RSSI is shown below. For example, when a condition expressed as Expression (1) shown below is satisfied for a frequency channel used in the nearby cell, the allocation of that frequency channel to the secondary cell may be prohibited:

$$RSSI - \alpha \times RSCP > \beta \quad (1)$$

where α and β are positive values. The parameters α and β may be supplied from the core network 83 or stored in advance in the home base station 3. The left-hand side (RSSI−α×RSCP) of Expression (1) becomes larger when a lot of mobile stations connect to the nearby cell or when high-speed communication service (such as HSDPA) having a high spreading code usage rate is provided in the nearby cell. That is, (RSSI−α×RSCP) is a quantity indicating the interference level of downlink signals received by mobile stations belonging to the nearby cell.

Figure 15:
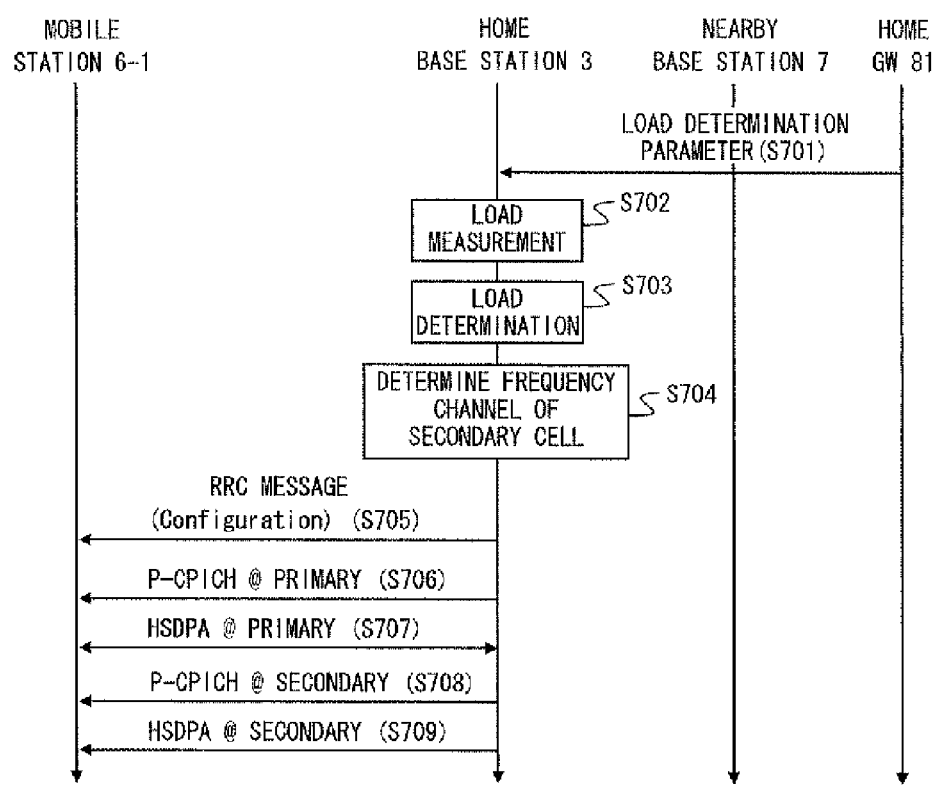
FIG. 15 is a sequence diagram showing an example of a procedure to determine a frequency channel of a secondary cell in accordance with the third exemplary embodiment of the invention.

Next, a specific example of a procedure to determine a frequency channel to be allocated to a secondary cell is explained hereinafter with reference to FIGS. 15 and 16. FIG. 15 is a sequence diagram showing interactions between the home GW 81, the nearby base station 7, the home base station 3, and the mobile station 6-1 that are performed when a frequency channel to be allocated to the secondary cell is determined.

In a step S701, a load determination parameter(s) is notified from the home GW 81 to the home base station 3. The load determination parameter is a parameter such as a determination threshold that is used for the load determination of a nearby cell made by the home base station 3. For example, α and β in the above-shown Expression (1) are examples of the load determination parameter. The load determination parameter may be stored in advance in a memory (not shown) of the home base station 3, and therefore may not necessarily be notified from the core network side including the home GW 81.

In a step S702, the home base station 3 measures the load of a nearby cell. In a step S703, the home base station 3 determines the load amount of the nearby cell by using the measurement result in the step S702. When the load of the nearby cell is determined to be larger than a predetermined criterion, the home base station 3 prohibits the allocation of the frequency channel used in the corresponding nearby cell to the secondary cell.

In a step S704, the home base station 3 determines a frequency channel to be allocated to the secondary cell with consideration given to the determination result in the step S703. Specifically, the home base station 3 excludes the frequency channel that is prohibited from being allocated due to the large load of the nearby cell, and selects a frequency channel for the secondary cell from the remaining frequency channel candidates. The home base station 3 may select a frequency channel that is used in a cell having the smallest load. Further, when there is a frequency channel that is not used by any nearby cell, the home base station 3 may select that frequency channel as the frequency channel for the secondary cell.

Incidentally, when all the frequency channel candidates are prohibited from being allocated based on the determination made in the step S703, the home base station 3 may stop DC-HSDPA and use only the primary cell to provide ordinary HSDPA service. Alternatively, the home base station 3 may relax the determination condition and determines the load status of the nearby cell again with the relaxed determination condition. Further, the home base station 3 may select a frequency channel that is used in a cell having the smallest load.

Steps S705 to S709 are similar to the above-described steps S105 to S109, and therefore their explanation is omitted.

Figure 16:
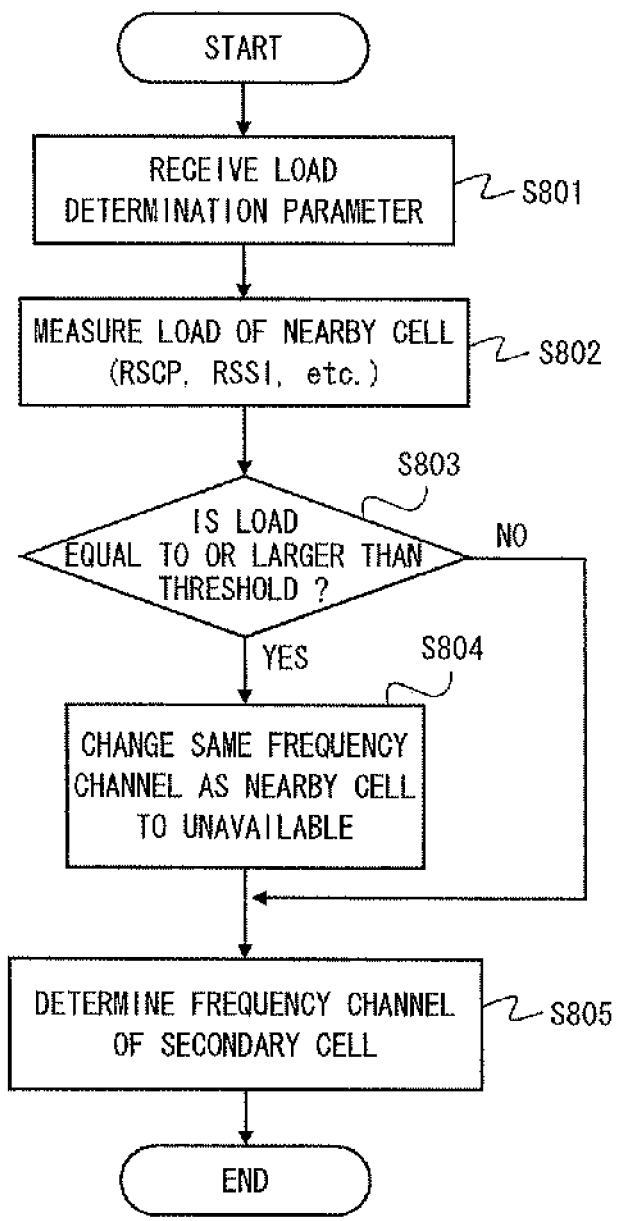
FIG. 16 is a flowchart showing a specific example of a procedure to determine a frequency channel of a secondary cell performed by a home base station.

FIG. 16 is a flowchart regarding a process to determine a frequency channel for secondary cell performed by the home base station 3. In a step S801, the frequency channel control unit 35 obtains a load determination parameter(s) from the home GW 81. Note that when the home base station 3 holds the load determination parameter in advance, the step S801 is omitted.

In a step S802, the mobile station mode reception unit 36 receives a radio signal transmitted by the nearby base station 7, and measures the load of the nearby cell. Note that although the execution order of the steps S801 and S802 is specified in FIG. 16 for the sake of convenience, their execution order is not limited to any particular orders. That is, the home base station 3 may perform the step S802 before the step S801, or may perform the steps S801 and S802 in parallel with each other.

In a step S803, the frequency channel control unit 35 refers to the measurement information (RSCP, RSSI, etc.) supplied from the mobile station mode reception unit 36, and thereby determines whether the load of the nearby cell exceeds a predetermined threshold or not.

When the load of the nearby cell exceeds the predetermined threshold (Yes at step S803), the frequency channel control unit 35 prohibits the use of the same frequency channel as that used in the nearby cell in the secondary cell (step S804).

In a step S805, the frequency channel control unit 35 selects a frequency channel to be allocated to the secondary cell from among the frequency channel candidates other than the frequency channel of which the use is prohibited in the step S804.

As described above, the home base station 3 in accordance with this exemplary embodiment autonomously determines the load of the nearby cell by receiving a radio signal transmitted by the nearby base station 7, and determines a frequency channel to be allocated to the secondary cell based on this determination result. As a result, the home base station 3 can suppress the interference to the nearby cell caused by the secondary cell.

Further, as described above with the first exemplary embodiment, the frequency channel determination process performed by the frequency channel control unit 35 may be implemented by using an ASIC, a DSP, a microprocessor, or the like.

Fourth Exemplary Embodiment

A radio communication system in accordance with this exemplary embodiment includes a home base station 4 and a nearby base station 7. The network configuration may be similar to that shown in FIG. 1, and therefore its graphical illustration is omitted here. This exemplary embodiment relates to a combination of the above-described second and third exemplary embodiments. That is, the home base station 4 explained below in this exemplary embodiment determines the load status of a nearby cell by using measurement information (Ptx, RTWP, etc.) obtained by the nearby base station 7 and measurement information (RSCP, RSSI, etc.) obtained by the home base station 4 itself.

Figure 17:
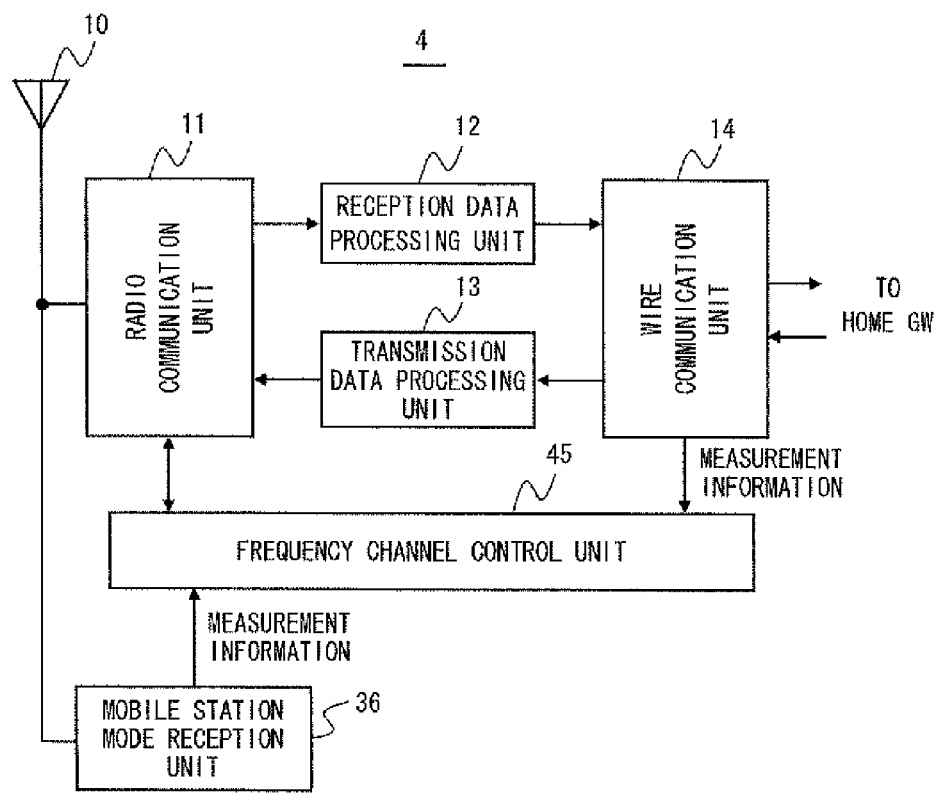
FIG. 17 is a block diagram showing a configuration example of a home base station included in a radio communication system in accordance with a fourth exemplary embodiment of the invention.

FIG. 17 is a block diagram showing a configuration example of the home base station 4. The functions and operations of an antenna 10, a radio communication unit 11, a reception data processing unit 12, a transmission data processing unit 13, a wire communication unit 14, and a mobile station mode reception unit 36 shown in FIG. 17 may be similar to those of the corresponding components explained above with the first to third exemplary embodiments.

A frequency channel control unit 45 determines a frequency channel to be allocated to the secondary cell. In this process, the frequency channel control unit 45 determines the load status of the nearby cell by using measurement information (Ptx, RTWP, etc.) received from the nearby base station 7 and measurement information (RSCP, RSSI, etc.) obtained by the mobile station mode reception unit 36. Then, when the frequency channel control unit 45 determines that the load of the nearby cell exceeds a predetermined criterion, the frequency channel control unit 45 excludes the same frequency channel as that used in the nearby cell from the frequency channel candidates that can be allocated to the secondary cell.

The combined-manner determination using the measurement information (Ptx, RTWP, etc.) received from the nearby base station 7 and the measurement information (RSCP, RSSI, etc.) obtained by the mobile station mode reception unit 36 may be performed, for example, in the following manner. When at least one of the above-shown Expression (1) and the conditional expressions as shown below as Expressions (2) and (3) is satisfied, the frequency channel control unit 45 may prohibit the allocation of the corresponding frequency channel to the secondary cell.

$$Ptx > \text{threshold } Pth \quad (2)$$

$$RTWP > \text{threshold } RTWPth \quad (3)$$

Figure 18:
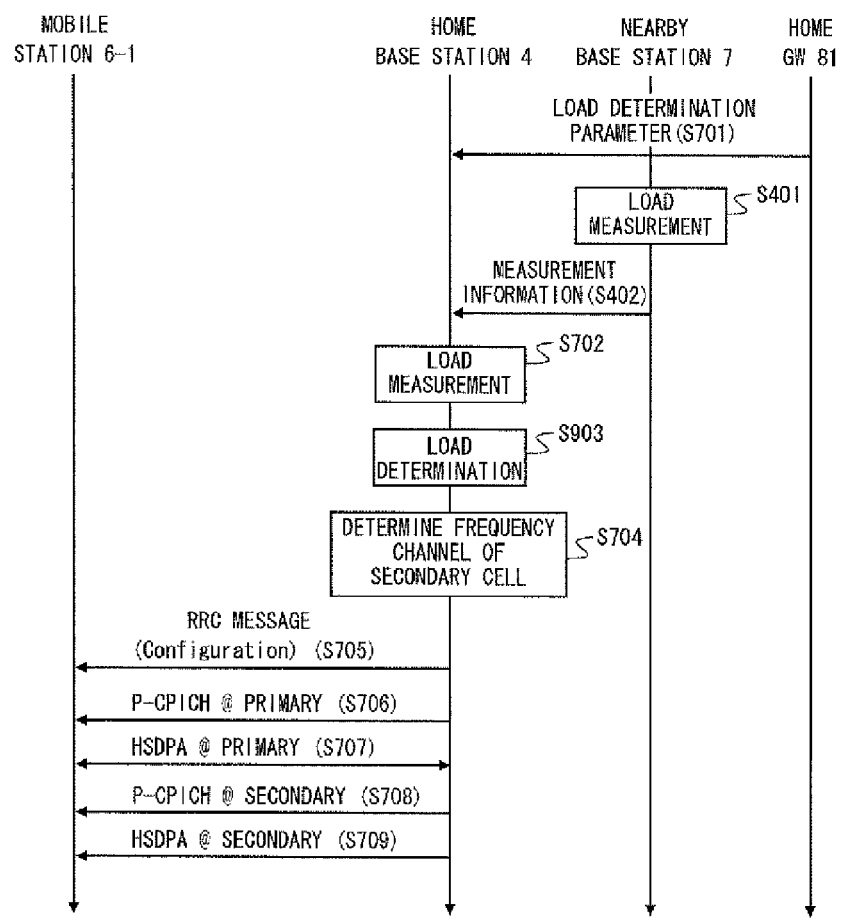
FIG. 18 is a sequence diagram showing an example of a procedure to determine a frequency channel of a secondary cell in accordance with the fourth exemplary embodiment of the invention.

FIG. 18 is a sequence diagram showing interactions between the home GW 81, the nearby base station 7, the home base station 4, and the mobile station 6-1 that are performed when a frequency channel to be allocated to the secondary cell is determined. Note that the sequence diagram shown in FIG. 18 is a combination of the two sequence diagrams (FIGS. 10 and 15) explained above with the second and third exemplary embodiments of the invention. Therefore, the details of the processes other than the process to make a combined-manner load determination in a step S903 are the same as those explained above. In the step S903, the home base station 4 determines the load status of the nearby cell by using measurement information (Ptx, RTWP, etc.) received from the nearby base station 7 and measurement information (RSCP, RSSI, etc.) obtained by the mobile station mode reception unit 36.

Figure 19:
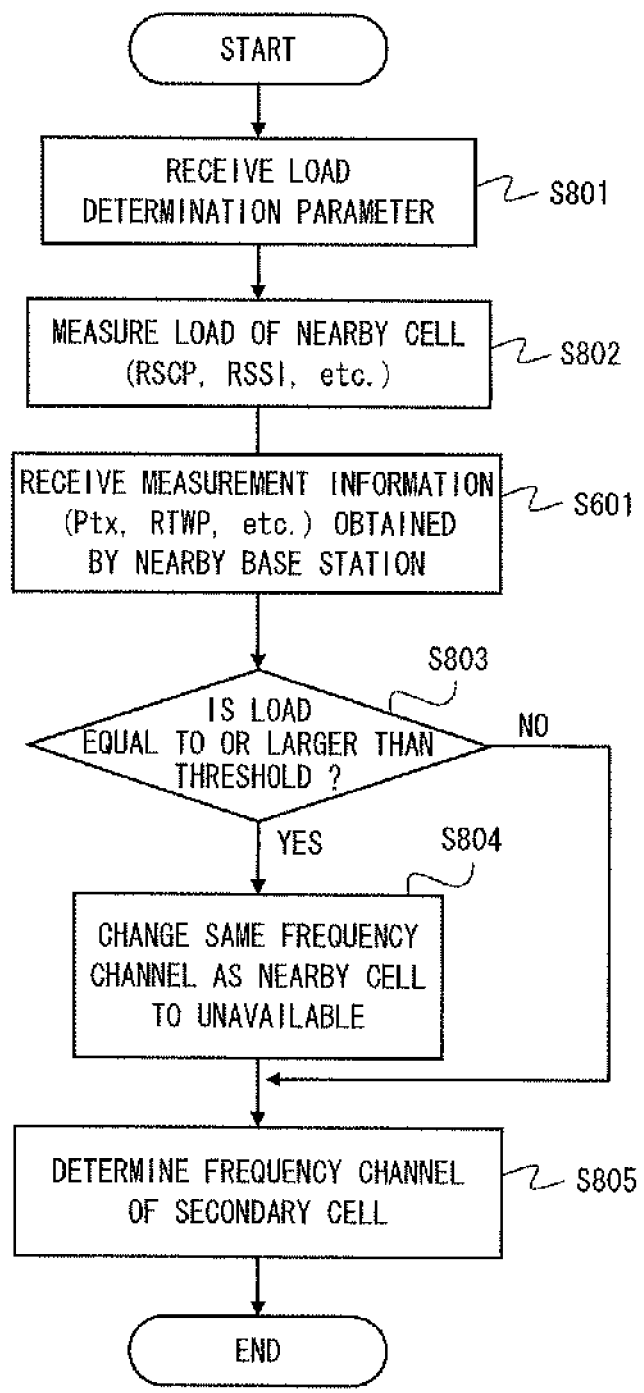
FIG. 19 is a flowchart showing a specific example of a procedure to determine a frequency channel of a secondary cell performed by a home base station.

FIG. 19 is a flowchart regarding a process to determine a frequency channel for secondary cell performed by the home base station 4. Note that the flowchart shown in FIG. 19 is a combination of the two flowcharts (FIGS. 12 and 16) explained above with the second and third exemplary embodiments of the invention. The details of the process in each step are already explained above, and therefore their explanation is omitted here. However, the load determination made by the frequency channel control unit 45 in the step S803 of FIG. 19 is the combined-manner determination described above in this exemplary embodiment.

As described above, the home base station 4 in accordance with this exemplary embodiment determines the load status of a nearby cell by using the measurement information (Ptx, RTWP, etc.) received from the nearby base station 7 and the measurement information (RSCP, RSSI, etc.) obtained by the mobile station mode reception unit 36 in a combined manner. As a result, the home base station 4 is able to determine the load of a nearby cell more accurately in comparison to the above-described home base stations 2 and 3.

Further, as described above with the first exemplary embodiment of the invention, the frequency channel determination process performed by the frequency channel control unit 45 may be implemented by using an ASIC, a DSP, a microprocessor, or the like.

Fifth Exemplary Embodiment

A home base station 5 in accordance with this exemplary embodiment performs the load status determination of a nearby cell similar to any one of the load status determinations in the above-described first to fourth exemplary embodiments even during a dual-cell operation. The dual-cell operation means an operating state in which HS-DSCH transfer is performed by two serving HS-DCCH cells. When the frequency channel used in the secondary cell is the same as the frequency channel used in the nearby cell, the home base station 5 stops the HS-DSCH transfer in the secondary cell in response to an increase in the load of the nearby cell during the dual-cell operation. Then, the home base station 5 starts a process to change the frequency channel of the secondary cell. This operation can be combines with any one of the above-described first and fourth exemplary embodiments. In the following explanation, a modified example of the home base station 4 explained above with the fourth exemplary embodiment of the invention is explained as a specific example of the home base station 5.

Figure 20:
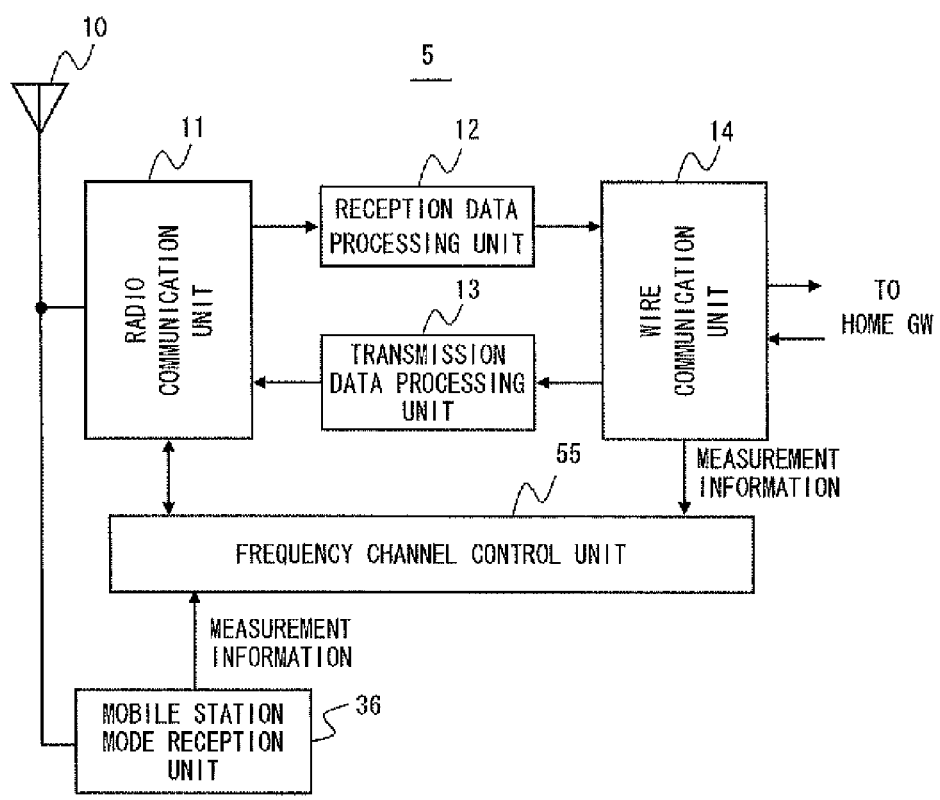
FIG. 20 is a block diagram showing a configuration example of a home base station included in a radio communication system in accordance with a fifth exemplary embodiment of the invention.

FIG. 20 is a block diagram showing a configuration example of the home base station 5. The functions and operations of an antenna 10, a radio communication unit 11, a reception data processing unit 12, a transmission data processing unit 13, a wire communication unit 14, and a mobile station mode reception unit 36 shown in FIG. 20 may be similar to those of the corresponding components explained above with the first to fourth exemplary embodiments of the invention.

Before starting a dual-cell operation, a frequency channel control unit 55 determines a frequency channel to be allocated to the secondary cell through a similar procedure to that of the frequency channel control unit 45. Further, even during the dual-cell operation, the frequency channel control unit 55 obtains measurement information (Ptx, RTWP, etc.) obtained by the nearby base station 7 and measurement information (RSCP, RSSI, etc.) obtained by the mobile station mode reception unit 36, and thereby determine the load of the nearby cell. To measure RSSI, RSCP, and the like during the dual-cell operation, the transmitting operation of the home base station 5 may be intermittently stopped so that the mobile station mode reception unit 36 selectively performs receiving operations during the time periods in which no transmission is performed by the home base station 5.

When the load of the nearby cell increases during the dual-cell operation, the frequency channel control unit 55 determines whether or not the frequency channel of the nearby cell in which the load has increased is the same as the frequency channel in the secondary cell. When the frequency channels are the same as each other, the frequency channel control unit 55 stops the operation of the secondary cell and performs re-allocation of a frequency channel to the secondary cell.

Figure 21:
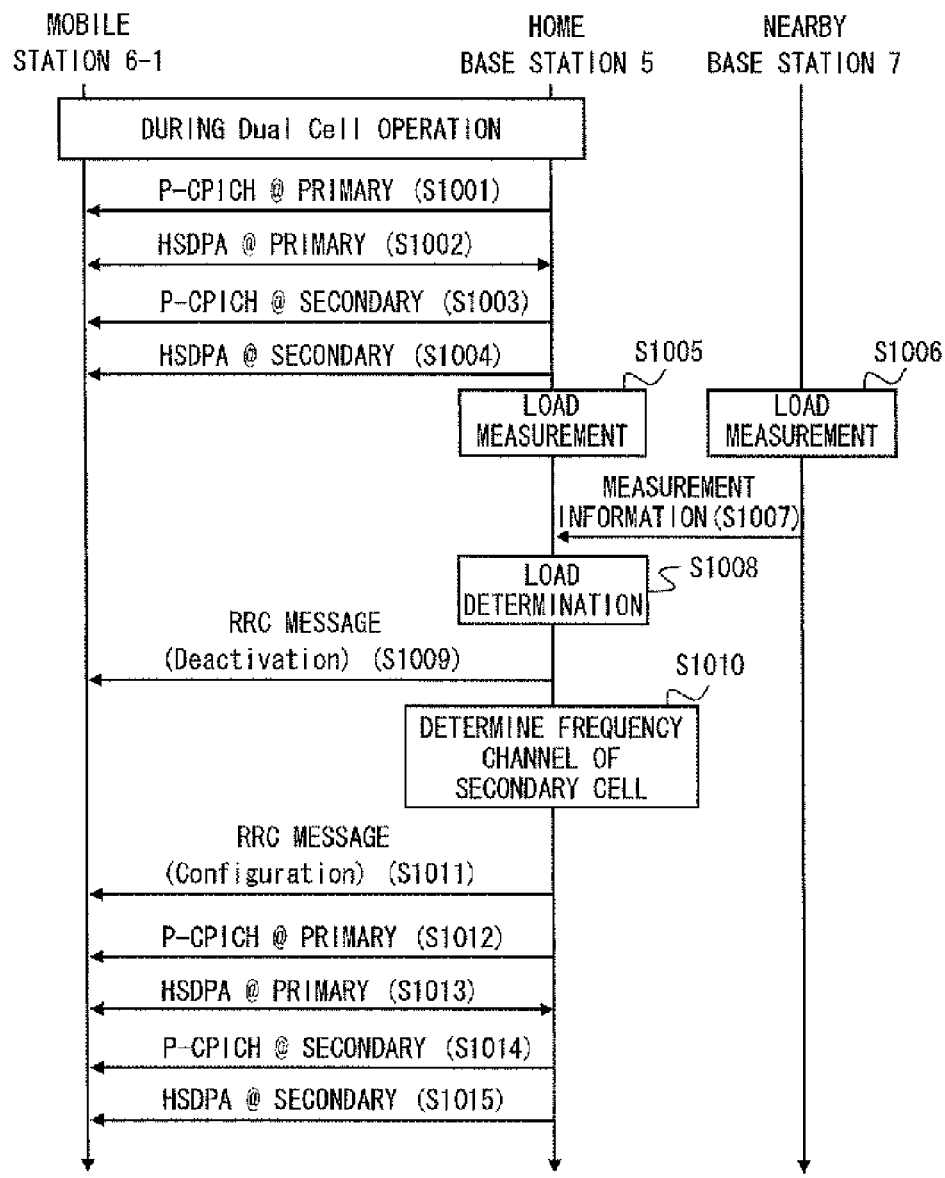
FIG. 21 is a sequence diagram showing an example of a procedure to determine a frequency channel of a secondary cell in accordance with the fifth exemplary embodiment of the invention.
Figure 22:
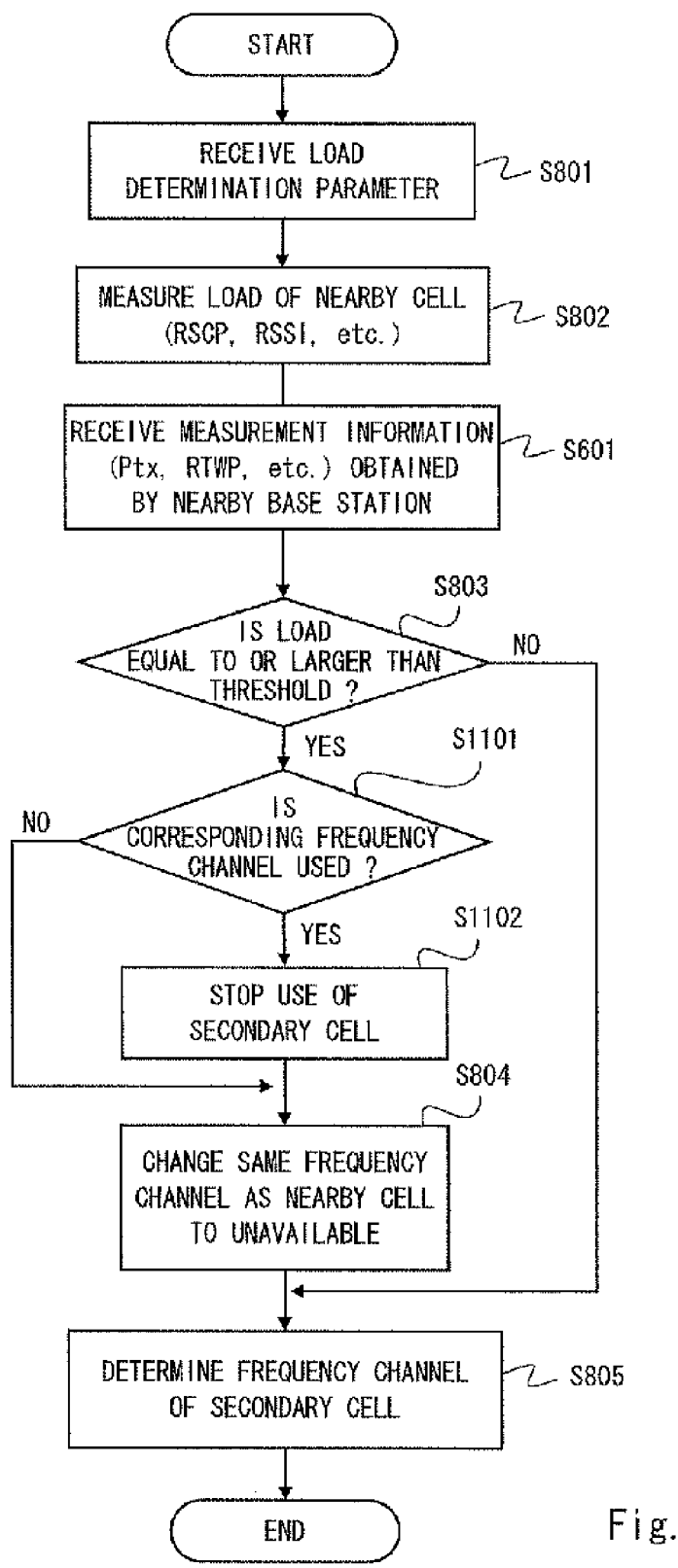
FIG. 22 is a flowchart showing a specific example of a procedure to determine a frequency channel of a secondary cell performed by a home base station.
Figure 23:
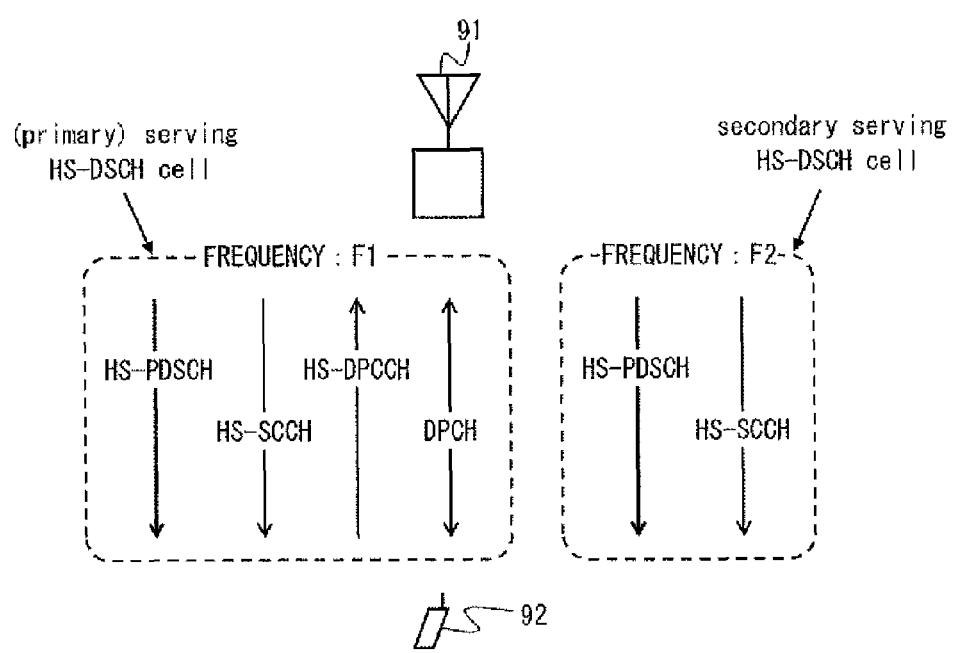
FIG. 23 shows physical channels used to perform packet communication using DC-HSDPA.

Next, specific procedures to stop the operation of the secondary cell and to re-allocate a frequency channel to the secondary cell are exampled hereinafter with reference to FIGS. 21 and 22. FIG. 22 is a sequence diagram showing interactions between the nearby base station 7, the home base station 5, and the mobile station 6-1.

Steps S1001 to S1004 represent transmitting/receiving processes between the home base station 5 and the mobile station 6-1 during a dual-cell operation, and these steps are similar to the steps S106 to S109 in FIG. 5.

In a step S1005, the home base station 5 measures the load of a nearby cell. In a step S1006, the nearby base station 7 measures the load of the nearby cell. In a step S1007, the nearby base station 7 transmits the measurement information to the home base station 5.

In a step S1008, the home base station 5 determines the load status of the nearby cell by using the measurement information (Ptx, RTWP, etc.) received from the nearby base station 7 and the measurement information (RSCP, RSSI, etc.) obtained by the home base station 5 itself. When the load of the nearby cell is determined to be larger than a predetermined criterion, the home base station 5 stops the operation of the secondary cell (step S1009). Specifically, the home base station 5 stops HS-DSCH transfer in the secondary cell, notifies the mobile station 6-1 of the deactivation of the secondary cell by using a command such as RRC MESSAGE (Deactivation) or HS-SCCH ORDER (Deactivation), and stops P-CPICH transmission of the secondary cell.

In a step S1010, the home base station 5 determines a new frequency channel to be allocated to the secondary cell. As for the procedure to determine a new frequency channel to be allocated, a similar procedure to one of the first to fourth exemplary embodiments of the invention may be used. Steps S1011 to S1015 in FIG. 21 are similar to the steps S105 to S109 in FIG. 5, and therefore their explanation is omitted.

FIG. 22 is a flowchart showing processing steps of the home base station 5 when stopping the operation of the secondary cell and re-allocating a frequency channel to the secondary cell. The difference between the flowchart in FIG. 22 and the previously-explained flowchart in FIG. 19 lies in the steps S1101 and S1102. The step S1101 is carried out when the load of the nearby cell is determined to be larger than the threshold. In the step S1101, the frequency channel control unit 55 determines whether or not the frequency channel of the nearby cell in which the load has increased is the same as the frequency channel in the secondary cell. When the two frequency channels are the same as each other (Yes at step S1101), the frequency channel control unit 55 stops the operation of the secondary cell.

As described above, the home base station 5 in accordance with this exemplary embodiment continuously monitors the load status of the nearby cell even after the start of a dual-cell operation, and thereby be able to stop the operation of the secondary cell in response to an increase in the load of the nearby cell. As a result, the home base station 5 can dynamically cope with changes in the load status of the nearby cell and thereby suppress the interference to the nearby cell Further, as described above with the first exemplary embodiment of the invention, the frequency channel determination process performed by the frequency channel control unit 55 may be implemented by using an ASIC, a DSP, a microprocessor, or the like.

Other Exemplary Embodiments

At least part of the frequency channel determination process performed by the frequency channel control units 15, 25, 35, 45, and 55 described above with the first to fifth exemplary embodiments of the invention may be carried out by an apparatus (e.g., RNC) located in the home GW 81 or the core network 83. In this case, the frequency channel control units 15, 25, 35, 45, and 55 may receive a determination result of the load status of a nearby cell, receive information on a frequency channel(s) prohibited from being allocated to the secondary cell, or receive information on a frequency channel that should be allocated to the secondary cell. That is, the task of each process included in the procedure to determine a frequency channel for the secondary cell (first to fifth exemplary embodiments) and the procedure to stop the operation of the secondary cell (fifth exemplary embodiment), which are explained above as being performed by the home base stations 1 to 5, can be arbitrarily shared between the home base stations 1 to 5 and the upper layer apparatuses to which the home base stations 1 to 5 connect.

Further, the above-described first to fifth exemplary embodiments are explained on the assumption that each of the home base stations 1 to 5 forms only one secondary cell. However, each of the home base stations 1 to 5 may form more than one secondary cell. The only requirement for the home base stations 1 to 5 is that they form at least one secondary cell and determine a frequency channel available to at least one cell included in the secondary cell based on the load status of the nearby cell.

In the above-described first to fifth exemplary embodiments, the present invention is applied to base stations that support DC-HSDPA of the W-CDMA type. However, the application of the present invention is not limited to base stations that support the W-CDMA-type DC-HSDPA. That is, the present invention can be applied to any base stations that use at least two cells having different frequency channels and communicate with a mobile station by transmitting a physical channel for data transmission in each of the two cells regardless of whether their multi-access scheme for the downlink channel is CDMA or not. In the case of LTE, for example, the mean value of the usage rate of downlink physical resource blocks or the total received power for each uplink physical resource block in the base station may be used as the measurement information indicating the load status of the nearby cell.

Further, the present invention is not limited to the above-described exemplary embodiments, and needless to say, various modifications can be made without departing from the above-described spirit of the present invention.

This application is based upon and claims the benefit of priority from Japanese patent application No. 2008-304754, filed on Nov. 28, 2008, the disclosure of which is incorporated herein in its entirety by reference.

REFERENCE SIGNS LIST 1 to 5 HOME BASE STATION
6-1, 6-2 MOBILE STATION
7 NEARBY BASE STATION
10 ANTENNA
11 RADIO COMMUNICATION UNIT
12 RECEPTION DATA PROCESSING UNIT
13 TRANSMISSION DATA PROCESSING UNIT
14 WIRE COMMUNICATION UNIT
15, 25, 35, 45, 55 FREQUENCY CHANNEL CONTROL UNIT
16, 36 MOBILE STATION MODE RECEPTION UNIT
70 ANTENNA
71 RADIO COMMUNICATION UNIT
72 RECEPTION DATA PROCESSING UNIT
73 TRANSMISSION DATA PROCESSING UNIT
74 WIRE COMMUNICATION UNIT
75 RESTRICTION INFORMATION GENERATION UNIT
76 LOAD MEASUREMENT UNIT
81 HOME GATEWAY (HOME GW)
82 RADIO NETWORK CONTROLLER (RNC)
83 CORE NETWORK

The invention claimed is:
1. A base station apparatus comprising:
a radio communication unit being capable of forming a first cell and a second cell that is dependently formed under condition of the formation of the first cell by using a frequency band different from that of the first cell, and transmitting a physical channel for data transmission in each of the first and second cells; and
a control unit being adapted to obtain at least one of measurement information relating to a load status of a nearby cell formed by a nearby base station and restriction information that is generated according to the load status of the nearby cell and indicates a use restriction of a frequency band used in the nearby cell, and determine whether to exclude the frequency band used in the nearby cell from frequency channel candidates that is allowed to be used in the second cell based on at least one of the measurement information and the restriction information, the measurement information including at least one of first measurement information generated by the nearby base station and second measurement information generated by the base station apparatus based on a reception result of a radio signal transmitted from the nearby base station.

2. The base station apparatus according to claim 1, wherein when the load status of the nearby cell exceeds a predetermined criterion, the control unit excludes a same frequency band as that used in the nearby cell from the frequency channel candidates.

3. The base station apparatus according to claim 1, wherein when the load status of the nearby cell exceeds a predetermined criterion while a same frequency band as that used in the nearby cell is being used in the second cell, the control unit stops the transmission of the physical channel for data transmission in the second cell.

4. The base station apparatus according to claim 1, wherein the first measurement information generated by the nearby base station includes at least one of an actual measurement value and a target value of a transmission power of the nearby base station, and an actual measurement value and a target value of a total uplink received power (RTWP) of the nearby base station.

5. The base station apparatus according to claim 4, wherein when the actual value or the target value of the transmission power of the nearby base station is larger than a predetermined value, the control unit excludes the frequency band used in the nearby cell from the frequency band candidates.

6. The base station apparatus according to claim 1, wherein the measurement information generated by the nearby base station is transferred to the base station apparatus through a network to which the base station apparatus and the nearby base station are connected, or wirelessly transmitted by the nearby base station.

7. The base station apparatus according to claim 1, wherein the second measurement information generated by the base station apparatus includes at least one of a received power of a pilot channel from the nearby cell (RSCP), a total received power within a frequency band of the nearby cell (RSSI), and RSCP/RSSI.

8. The base station apparatus according to claim 7, wherein when a load amount calculated from the RSCP and the RSSI is larger than a predetermined value, the control unit excludes the frequency band used in the nearby cell from the frequency band candidates.

9. The base station apparatus according to claim 7, wherein when a load amount calculated from the RSCP and the RSSI is larger than a predetermined value, the control unit stops the transmission of the physical channel for data transmission in the second cell to which a same frequency band as that used in the nearby cell is allocated.

10. The base station apparatus according to claim 1, wherein when a frequency band used in the second cell corresponds to a frequency band of which use is restricted by the restriction information, the control unit stops the transmission of the physical channel for data transmission in the second cell.

11. The base station apparatus according to claim 1, wherein the restriction information is transferred to the base station apparatus through a network to which the base station apparatus and the nearby base station are connected, or wirelessly transmitted by the nearby base station.

12. The base station apparatus according to claim 1, wherein the increase in the load status of the nearby cell has relevance to a decrease in an interference tolerance of the nearby cell.

13. The base station apparatus according to claim 1, wherein a magnitude of the load status of the nearby cell has relevance to a number of physical channels within a frequency band used by the nearby cell.

14. The base station apparatus according to claim 1, wherein
    the base station apparatus supports a dual-cell HSDPA operation (DC-HSDPA) in which High Speed Downlink Packet Access (HSDPA) is simultaneously provided in the first and second cells,
    the physical channel for data transmission is a High Speed Physical Downlink Common Channel (HS-PDSCH),
    the first cell is a serving HS-DSCH cell, and
    the second cell is a secondary-serving HS-DSCH cell.

15. A control method of a base station apparatus, the base station apparatus being capable of forming a first cell and a second cell that is dependently formed under condition of the formation of the first cell by using a frequency band different from that of the first cell, and transmitting a physical channel for data transmission in each of the first and second cells, the method comprising:
    obtaining at least one of measurement information relating to a load status of a nearby cell formed by a nearby base station and restriction information that is generated according to the load status of the nearby cell and indicates a use restriction of a frequency band used in the nearby cell, the measurement information including at least one of first measurement information generated by the nearby base station and second measurement information generated by the base station apparatus based on a reception result of a radio signal transmitted from the nearby base station;
    determining whether to exclude the frequency band used in the nearby cell from frequency channel candidates that is allowed to be used in the second cell based on at least one of the measurement information and the restriction information; and
    transmitting a physical channel for data transmission in the second cell formed by using a frequency band selected from the frequency channel candidates.

16. The method according to claim 15, wherein the determining includes excluding a same frequency band as that used in the nearby cell from the frequency channel candidates when the load status of the nearby cell exceeds a predetermined criterion.

17. The method according to claim 15, further comprising stopping the transmission of the physical channel for data transmission in the second cell when the load status of the nearby cell exceeds a predetermined criterion while a same frequency band as that used in the nearby cell is being used in the second cell.

18. The method according to claim 15, wherein the first measurement information includes at least one of an actual measurement value and a target value of a transmission power of the nearby base station, and an actual measurement value and a target value of a total uplink received power (RTWP) of the nearby base station.

19. The method according to claim 18, wherein the determining includes excluding the frequency band used in the nearby cell from the frequency band candidates when the actual value or the target value of the transmission power of the nearby base station is larger than a predetermined value.

20. The method according to claim 15, wherein
the second measurement information generated by the base station apparatus includes at least one of a received power of a pilot channel from the nearby cell (RSCP) and a total received power within a frequency band of the nearby cell (RSSI), and
the determining includes excluding the frequency band used in the nearby cell from the frequency band candidates when a load amount calculated from the RSCP and the RSSI is larger than a predetermined value.

21. The method according to claim 15, wherein
the second measurement information generated by the base station apparatus includes at least one of a received power of a pilot channel from the nearby cell (RSCP) and a total received power within a frequency band of the nearby cell (RSSI), and
the method further comprises stopping, when a load amount calculated from the RSCP and the RSSI is larger than a predetermined value, the transmission of the physical channel for data transmission in the second cell to which a same frequency band as that used in the nearby cell is allocated.

22. The method according to claim 15, further comprising stopping the transmission of the physical channel for data transmission in the second cell when a frequency band used in the second cell corresponds to a frequency band of which use is restricted by the restriction information.

23. A communication system comprising:
a first base station being capable of forming a first cell and a second cell that is dependently formed under condition of the formation of the first cell by using a frequency band different from that of the first cell, and transmitting a physical channel for data transmission in each of the first and second cells, and
a second base station being capable of forming a nearby cell in a vicinity of the first and second cells,
wherein the first base station obtains at least one of measurement information relating to a load status of the nearby cell and restriction information that is generated according to the load status of the nearby cell and indicates a use restriction of a frequency band used in the nearby cell, and determines whether to exclude the frequency band used in the nearby cell from frequency channel candidates that is allowed to be used in the second cell based on at least one of the measurement information and the restriction information, and
the measurement information includes at least one of first measurement information generated by the second base station and second measurement information generated by the first base station based on a reception result of a radio signal transmitted from the nearby base station.

24. The communication system according to claim 23, wherein when the load status of the nearby cell exceeds a predetermined criterion, the first base station excludes a same frequency band as that used in the nearby cell from the frequency channel candidates.

25. The communication system according to claim 23, wherein when the load status of the nearby cell exceeds a predetermined criterion while a same frequency band as that used in the nearby cell is being used in the second cell, the first base station stops the transmission of the physical channel for data transmission in the second cell.

26. The communication system according to claim 23, wherein the first measurement information generated by the second base station includes at least one of an actual measurement value and a target value of a transmission power of the second base station, and an actual measurement value and a target value of a total uplink received power (RTWP) of the second base station.

27. The communication system according to claim 26, wherein when the actual value or the target value of the transmission power of the second base station is larger than a predetermined value, the first base station excludes the frequency band used in the nearby cell from the frequency band candidates.

28. The communication system according to claim 23, wherein the first measurement information generated by the second base station is transferred to the first base station through a network to which the first and second base stations are connected, or wirelessly transmitted by the second base station.

29. The communication system according to claim 23, wherein
the second measurement information generated by the first base station includes at least one of a received power of a pilot channel from the nearby cell (RSCP) and a total received power within a frequency band of the nearby cell (RSSI), and
when a load amount calculated from the RSCP and the RSSI is larger than a predetermined value, the first base station excludes the frequency band used in the nearby cell from the frequency band candidates.

30. The communication system according to claim 23, wherein
the second measurement information generated by the first base station includes at least one of a received power of a pilot channel from the nearby cell (RSCP) and a total received power within a frequency band of the nearby cell (RSSI), and
when a load amount calculated from the RSCP and the RSSI is larger than a predetermined value, the first base station stops the transmission of the physical channel for data transmission in the second cell to which a same frequency band as that used in the nearby cell is allocated.

31. The communication system according to claim 23, wherein when a frequency band used in the second cell corresponds to a frequency band of which use is restricted by the restriction information, the first base station stops the transmission of the physical channel for data transmission in the second cell.

32. The communication system according to claim 23, wherein the restriction information is transferred to the first base station through a network to which the first and second base stations are connected, or wirelessly transmitted by the second base station.

33. A non-transitory storage medium storing a program that causes a computer to perform control processing of a base station apparatus, the base station apparatus being capable of forming a first cell and a second cell that is dependently formed under condition of the formation of the first cell by using a frequency band different from that of the first cell, and transmitting a physical channel for data transmission in each of the first and second cells,
the control processing comprising:
obtaining at least one of measurement information relating to a load status of a nearby cell, formed by a nearby base station and restriction information that is generated according to the load status of the nearby cell and indicates a use restriction of a frequency band used in the nearby cell, the measurement information including at least one of first measurement information generated by the nearby base station and second measurement information generated by the base station apparatus based on a reception result of a radio signal transmitted from the nearby base station; and determining whether to exclude a frequency band used in the nearby cell from frequency channel candidates that is allowed to be used in the second cell based on at least one of the measurement information and the restriction information.

\* \* \* \* \*